United States Patent [19]
Campanella et al.

[11] Patent Number: 6,115,366
[45] Date of Patent: Sep. 5, 2000

[54] SYSTEM FOR MANAGING SPACE SEGMENT USAGE AMONG BROADCAST SERVICE PROVIDERS

[75] Inventors: S. Joseph Campanella, Gaithersburg, Md.; G. Christopher Harris, Washington, D.C.

[73] Assignee: WorldSpace, Inc., Washington, D.C.

[21] Appl. No.: 08/746,069

[22] Filed: Nov. 5, 1996

[51] Int. Cl.[7] .................................................. H04B 7/204
[52] U.S. Cl. .......................... 370/319; 455/427; 455/12.1; 455/13.2; 370/315; 370/316
[58] Field of Search .................................... 370/279, 315, 370/321, 324, 325, 326, 280, 281, 294, 319; 455/422, 427, 428, 7, 12.1, 13.1, 39, 406; 348/6, 7, 12, 13

[56] References Cited

U.S. PATENT DOCUMENTS

| | | | |
|---|---|---|---|
| 4,425,639 | 1/1984 | Acampara et al. | 370/50 |
| 4,720,873 | 1/1988 | Goodman et al. | |
| 4,792,963 | 12/1988 | Campanella et al. | |
| 4,901,310 | 2/1990 | Ichiyoshi. | |
| 4,931,802 | 6/1990 | Assal et al. | 342/356 |
| 5,187,805 | 2/1993 | Bertiger et al. | 455/12.1 |
| 5,299,192 | 3/1994 | Guo et al. | |
| 5,303,393 | 4/1994 | Noreen et al. | |
| 5,347,548 | 9/1994 | Messerges et al. | |
| 5,416,774 | 5/1995 | Shigematsu et al. | |
| 5,455,823 | 10/1995 | Noreen et al. | |
| 5,473,601 | 12/1995 | Rosen et al. | 370/50 |
| 5,483,663 | 1/1996 | Tawil | 455/3.2 |
| 5,590,395 | 12/1996 | Diekelman | 455/13.1 |
| 5,603,077 | 2/1997 | Muckle et al. | 455/3.2 |
| 5,655,005 | 8/1997 | Wiedeman et al. | 370/320 |
| 5,659,545 | 8/1997 | Sowles et al. | 370/324 |
| 5,678,175 | 10/1997 | Stuart et al. | 455/13.1 |
| 5,689,245 | 11/1997 | Noreen et al. | |
| 5,734,589 | 3/1998 | Kostreski et al. | 364/514 A |
| 5,838,668 | 11/1998 | Okada et al. | 370/312 |

OTHER PUBLICATIONS

"Communications Satellites: Orbiting into the '90s"—Aug. 1990 *IEEE Spectrum*, pp 49–52.
"World Space: The First DAB Satellite Service for the World" Fournié et al., Oct. 10, 1995, pp. 1–7.
"Digital Audio Broadcasting: High Grade Service Quality Through On–Board Processing Techniques", Lusquadro, G. (©1945, John Wiley & Sons, Ltd.).

*Primary Examiner*—Edward F. Urban
*Assistant Examiner*—Congvan Tran
*Attorney, Agent, or Firm*—Roylance, Abrams, Berdo & Goodman

[57] ABSTRACT

A system for managing a satellite and a number of broadcast stations, which generate programs for transmission to remote radio receivers on broadcast channels via the satellite, comprises a satellite control system for controlling the attitude and orbit of the satellite and on-board processing of the programs uplinked to the satellite. A broadcast control system is connected to the satellite control center and to the broadcast stations. The broadcast control system assigns selected ones of the broadcast channels to service providers desiring to uplink at least one of the programs to the satellite, to store channel data relating to the assignments of the broadcast channels and provide the channel data to the satellite control system, and to bill the service providers according to the number of the broadcast channels assigned thereto. The broadcast control system provides the service providers with a plurality of options comprising the number of said broadcast channels to be reserved for uplink transmission, dates and times of day for using the reserved broadcast channels, and which of a number beams associated with the satellite are to be used for downlink transmission. The broadcast control system notifies the satellite control system as to which of the beams are to be used and when, and the satellite control system generates corresponding data processing signals for routing the program to selected ones of the beams.

14 Claims, 12 Drawing Sheets

SYSTEM FOR MANAGING SPACE SEGMENT USAGE AMONG BROADCAST SERVICE PROVIDERS

Patent Application of S. Joseph Campanella, filed Nov. 5, 1996 under Ser. No. 08/746,070 and entitled "Satellite Payload Processing System for Switching Uplink Signals to Time Division Multiplexed Downlink Signals"; in co-pending U.S. Patent Application of S. Joseph Campanella, filed on Nov. 5, 1996 under Ser. No. 08/746, 071 and entitled "Satellite Payload Processing System Using Polyphase Demultiplexing and Quadrature Phase Shift Keying Demodulation"; and in co-pending U.S. Patent Application of S. Joseph Campanella, filed on Nov. 5, 1996 under Ser. No. 08/746,072 and entitled "Satellite Payload Processing System Providing On-Board Rate Alignment"; all of said applications being expressly incorporated herein by reference.

FIELD OF THE INVENTION

The invention relates a system for monitoring space segment usage, broadcast quality and satellite operations in a satellite broadcast system.

BACKGROUND OF THE INVENTION

There presently exists a population of over 4 billion people that are generally dissatisfied and underserved by the poor sound quality of short-wave radio broadcasts, or the coverage limitations of amplitude modulation (AM) band and frequency modulation (FM) band terrestrial radio broadcast systems. This population is primarily located in Africa, Central and South America, and Asia. A need therefore exists for a satellite-based direct radio broadcast system to transmit signals such as audio, data and images to low-cost consumer receivers.

A number of satellite communications networks have been developed for commercial and military applications. These satellite communications systems, however, have not addressed the need to provide multiple, independent broadcast service providers with flexible and economical access to a space segment, nor consumers' need to receive high quality radio signals using low-cost consumer radio receiver units. A need therefore exists for providing service providers with direct access to a satellite and choices as to the amount of space segment that's purchased and used. In addition, a need exists for a low-cost radio receiver unit capable of receiving time division multiplexed downlink bit stream.

SUMMARY OF THE INVENTION

In accordance with an aspect of the present invention, a system is provided for managing a satellite and a number of broadcast stations for generating programs for transmission to remote radio receivers on broadcast channels via the satellite. The system comprises a satellite control system configured to generate control signals for controlling the attitude and orbit of the satellite, and command signals for controlling on-board processing of the programs uplinked to the satellite. At least one telemetry range an control system is connected to the satellite control center to communicate with the satellite to provide the control signals and the data processing signals thereto.

The system also comprises a broadcast control system connected to the satellite control center and to the broadcast stations. The broadcast control system is operable to assign selected ones of the broadcast channels to service providers desiring to uplink at least one of the programs to the satellite, to store channel data relating to the assignments of the broadcast channels and provide the channel data to the satellite control system, and to bill the service providers according to the number of the broadcast channels assigned thereto. The broadcast control system provides the service providers with a plurality of options comprising the number of said broadcast channels to be reserved for uplink transmission, dates and times of day for using the reserved broadcast channels, and which of a number beams associated with the satellite are to be used for downlink transmission. The broadcast control system notifies the satellite control system as to which of the beams are to be used, and the satellite control system generates corresponding data processing signals for routing the program to selected ones of the beams, The broadcast control system is also operable to instruct the broadcast stations as to when to terminate use of the broadcast channels assigned thereto during the dates and times of day when the broadcast channels are not reserved therefor.

In accordance with another aspect of the invention, the broadcast control station is programmable to perform a defragmentation process on the broadcast channel assignments to make more efficient use of the space segment.

In accordance with another aspect of the invention, the transmitted signals are digital and are, therefore, more robust against transmission impairments. Digital signaling also provides flexibility for supplying a full scope of future services.

A BRIEF DESCRIPTION OF THE DRAWINGS

These and other features and advantages of the present invention will be more readily comprehended from the following detailed description when read in connection with the appended drawings, which form a part of this original disclosure, and wherein.

DETAILED DESCRIPTION OF THE PREFERRED EMBODIMENTS

Overview

Figure 1:
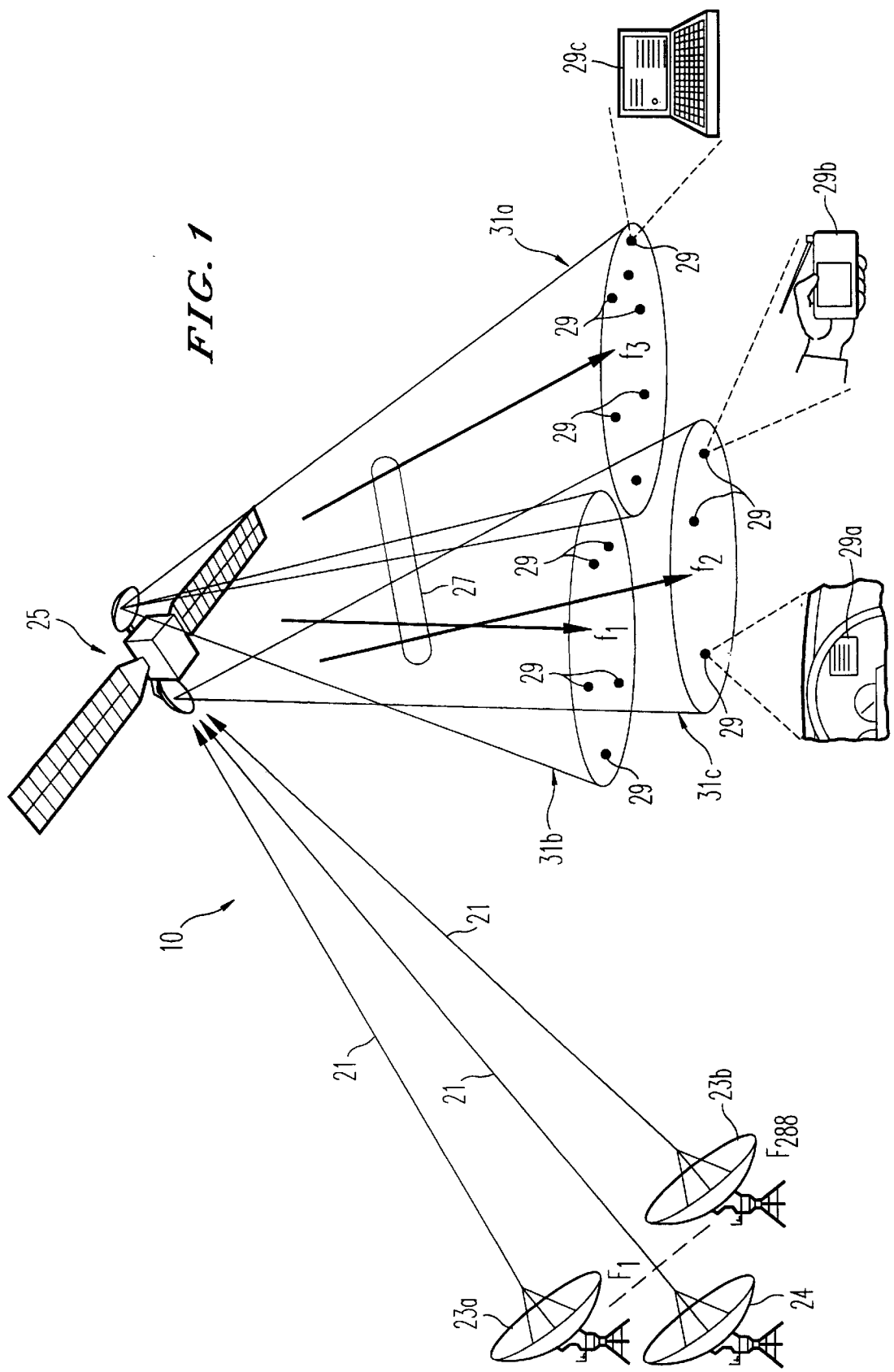
FIG. 1 is a schematic diagram of a satellite direct broadcast system constructed in accordance with an embodiment of the present invention.

In accordance with the present invention, a satellite-based radio broadcast system 10 is provided to broadcast programs via a satellite 25 from a number of different broadcast stations 23a and 23b (hereinafter referred to generally as 23), as shown in FIG. 1. Users are provided with radio receivers, indicated generally at 29, which are designed to receive one or more time division multiplexed (TDM) L-band carriers 27 downlinked from the satellite 25 that are modulated at 1.86 Megasymbols per second (Msym/s). The user radios 29 are designed to demodulate and demultiplex the TDM carrier to recover bits that constitute the digital information content or program transmitted on broadcast channels from the broadcast stations 23. In accordance with an embodiment of the invention, the broadcast stations 23 and the satellite 25 are configured to format uplink and downlink signals to allow for improved reception of broadcast programs using relatively low cost radio receivers. A radio receiver can be a mobile unit 29a mounted in a transportation vehicle, for example, a hand-held unit 29b or a processing terminal 29c with a display.

Although only one satellite 25 is shown in FIG. 1 for illustrative purposes, the system 10 preferably comprises three geostationary satellites 25a, 25b and 25c (FIG. 12) configured to use frequency bands of 1467 to 1492 Megahertz (MHz) which has been allocated for broadcasting satellite service (BSS) direct audio broadcast (DAB). The broadcast stations 23 preferably use feeder uplinks 21 in the X-band, that is from 7050 to 7075 MHz. Each satellite 25 is preferably configured to operate three downlink spot beams indicated at 31a, 31b and 31c. Each beam covers approximately 14 million square kilometers within power distribution contours that are four decibels (dB) down from beam center and 28 million square kilometers within contours that are eight dB down. The beam center margin can be 14 dB based on a receiver gain-to-temperature ratio of −13 dB/K.

With continued reference to FIG. 1, the uplink signals 21 generated from the broadcast stations 23 are modulated in frequency division multiple access (FDMA) channels from the ground stations 23 which are preferably located within the terrestrial visibility of the satellite 25. Each broadcast station 23 preferably has the ability to uplink directly from its own facilities to one of the satellites and to place one or more 16 kilobit per second (kbps) prime rate increments on a single carrier. Use of FDMA channels for uplink allows for a significant amount of flexibility for sharing the space segment among multiple independent broadcast stations 23 and significantly reduces the power and hence the cost of the uplink earth stations 23. Prime rate increments (PRIs) of 16 kilobits per second (kbps) are preferably the most fundamental building block or rudimentary unit used in the system 10 for channel size and can be combined to achieve higher bit rates. For example, PRIs can be combined to create program channels with bit rates up to 128 kbps for near compact disc quality sound or multimedia broadcast programs comprising image data, for example.

Conversion between uplink FDMA channels and downlink multiple channel per carrier/time division multiplex (MCPC/TDM) channels is achieved on-board each satellite 25 at the baseband level. As will be described in further detail below, prime rate channels transmitted by a broadcast station 23 are demultiplexed at the satellite 25 into individual 16 kbps baseband signals. The individual channels are then routed to one or more of the downlink beams 31a, 31b and 31c, each of which is a single TDM stream per carrier signal. This baseband processing provides a high level of channel control in terms of uplink frequency allocation and channel routing between uplink FDMA and downlink TDM signals.

Figure 2:
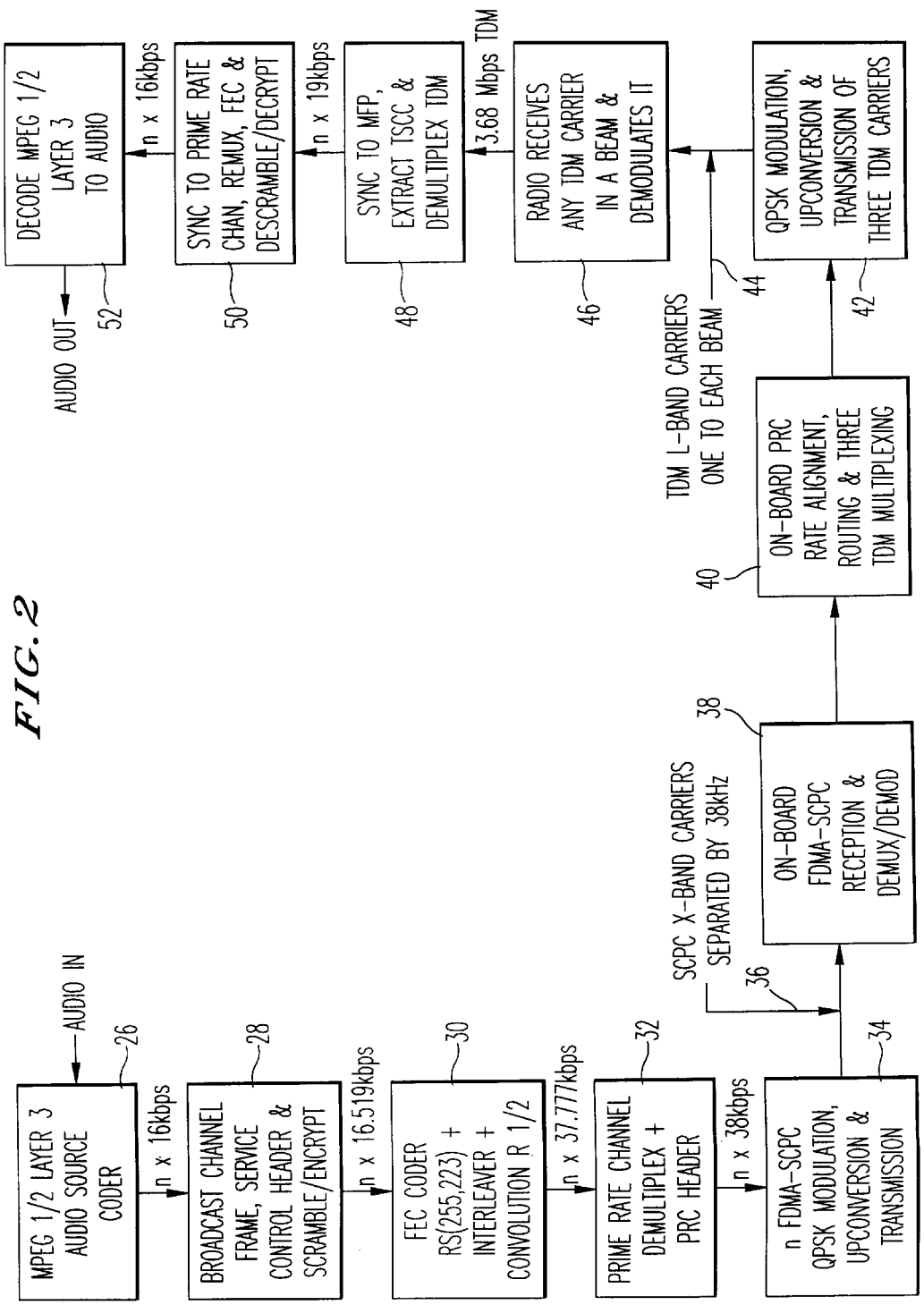
FIG. 2 is a flow chart depicting the sequence of operations for end-to-end signal processing in the system depicted in FIG. 1 in accordance with an embodiment of the present invention.

The end-to-end signal processing that occurs in the system 10 is described with reference to FIG. 2. The system components responsible for the end-to-end signal processing is described in further detail below with reference to FIGS. 3–11. As shown in FIG. 2, audio signals from an audio source, for example, at a broadcast station 23, are preferably coded using MPEG 2.5 Layer 3 coding (block 26). The digital information assembled by a broadcast service provider at a broadcast station 23 is preferably formatted in 16 kbps increments or PRIs where n is the number of PRIs purchased by the service provider (i.e., n×16 kbps). The digital information is then formatted into a broadcast channel frame having a service control header (SCH) (block 28), described in further detail below. A periodic frame in the system 10 preferably has a period duration of 432 milliseconds (ms). Each frame is preferably assigned n×224 bits for the SCH such that the bit rate becomes approximately n×16.519 kbps. Each frame is next scrambled by addition of a pseudo random bit stream to the SCH. Information control of the scrambling pattern by a key permits encryption. The bits in a frame are subsequently coded for forward error correction (FEC) protection using preferably two concatenated coding methods such as the Reed Solomon method, followed by interleaving, and then convolution coding (e.g., trellis convolution coding described by Viterbi) (block 30). The coded bits in each frame corresponding to each PRI are subsequently subdivided or demultiplexed into n parallel prime rate channels (PRCs) (block 32). To implement recovery of each PRC, a PRC synchronization header is provided. Each of the n PRCs is next differentially encoded and then modulated using, for example, quadrature phase shift keying modulation onto an intermediate frequency (IF) carrier frequency (block 34). The n PRC IF carrier frequencies constituting the broadcast channel of a broadcast station 23 is converted to the X-band for transmission to the satellite 25, as indicated by the arrow 36.

The carriers from the broadcast stations 23 are single channel per carrier/frequency division multiple access (SCPC/FDMA) carriers. On-board each satellite 25, the SCPC/FDMA carriers are received, demultiplexed and demodulated to recover the PRC carriers (block 38). The PRC digital baseband channels recovered by the satellite 25 are subjected to a rate alignment function to compensate for clock rate differences between the on-board satellite clock and that of the PRC carriers received at the satellite (block 40). The demultiplexed and demodulated digital streams obtained from the PRCs are provided to TDM frame assemblers using routing and switching components. The PRC digital streams are routed from demultiplexing and demodulating equipment on-board the satellite 25 to the TDMA frame assemblers in accordance with a switching sequence unit on-board the satellite that is controlled from an earth station via a command link (e.g., a satellite control center 236 in FIG. 12 for each operating region). Three TDM carriers are created which correspond to each of the three satellite beams 31a, 31b and 31c (block 42). The three TDM carriers are up converted to L-band frequencies following QPSK modulation, as indicated by arrow 44. Radio receivers 29 are configured to receive any of the three TDM carriers and to demodulate the received carrier (block 46). The radio receivers 29 are designed to synchronize a TDM bit stream using a master frame preamble provided during on-board satellite processing (block 48). PRCs are demultiplexed from the TDM frame using a Time Slot Control Channel (TSCC), as well. The digital streams are then remultiplexed into the FEC-coded PRC format described above with reference to block 30 (block 50). The FEC processing preferably includes decoding using a Viterbi trellis decoder, for example, deinterleaving, and then Reed Solomon decoding to recover the original broadcast channel comprising n×16 kbps channel and the SCH. The n×16 kbps segment of the broadcast channel is supplied to an MPEG 2.5 Layer 3 source decoder for conversion back to audio. In accordance with the present invention, the audio output is available via a very low cost broadcast radio receiver 27 due to the processing and TDM formatting described above in connection with the broadcast station(s) 23 and the satellite 25 (block 52).

Uplink Multiplexing and Modulation

Signal processing to convert data streams from one or more broadcast stations 23 into parallel streams for transmission to a satellite 25 will now be described with reference to FIG. 3. For illustrative purposes, four sources 60, 64, 68, and 72 of program information are shown. Two sources 60 and 64, or 68 and 72, are coded and transmitted together as part of a single program or service. The coding of the program comprising combined audio sources 60 and 64 will be described. The signal processing of the program comprising digital information from sources 68 and 72 is identical.

As stated previously, broadcast stations 23 assemble information from one or more sources 60 and 64 for a particular program into broadcast channels characterized by increments of 16 kbps. These increments are referred to as prime rate increments or PRIs. Thus, the bit rate carried in a broadcast channel is n×16 kbps were n is the number of PRIs used by that particular broadcast service provider. In addition, each 16 kbps PRI can be further divided into two 8 kbps segments which are routed or switched together through the system 10. The segments provide a mechanism for carrying two different service items in the same PRI such as a data stream with low bit rate speech signals, or two low bit rate speech channels for two respective languages, and so on. The number of PRIs are preferably predetermined, that is, set in accordance with program code. The number n, however, is not a physical limitation of the system 10. The value of n is generally set on the basis of business concerns such as the cost of a single broadcast channel and the willingness of the service providers to pay. In FIG. 3, n for the first broadcast channel 59 for sources 60 and 64 is equal to 4. The value of n for the broadcast channel 67 for sources 68 and 72 is set to 6 in the illustrated embodiment.

Figure 3:
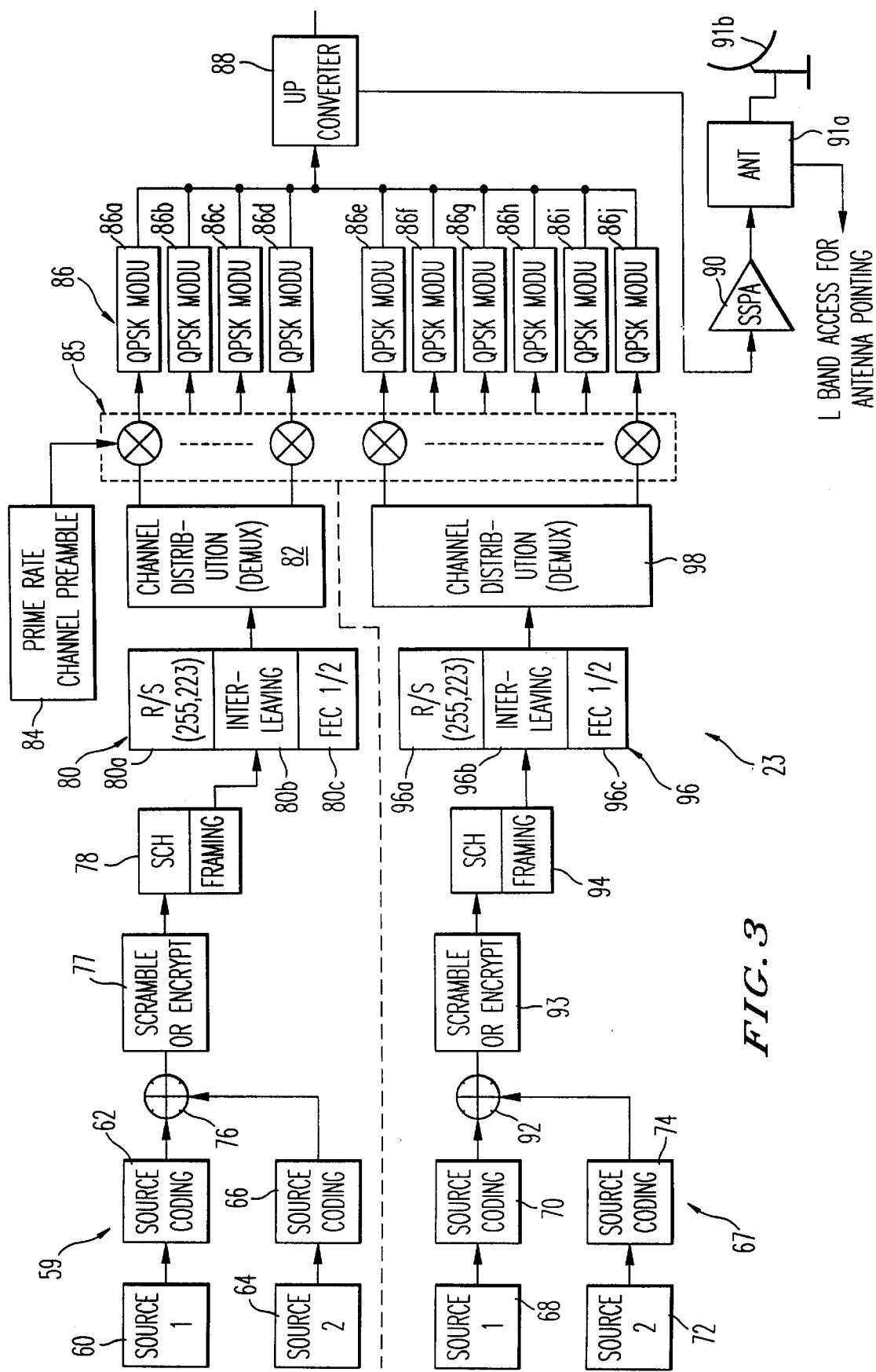
FIG. 3 is a schematic block diagram of a broadcast earth station constructed in accordance with an embodiment of the present invention.

As shown in FIG. 3, more than one broadcast service provider can have access to a single broadcast station 23. For example, a first service provider generates broadcast channel 59, while a second service provider can generate broadcast channel 67. The signal processing described herein and in accordance with the present invention allows data streams from several broadcast service providers to be broadcast to a satellite in parallel streams which reduces the cost of broadcasting for the service providers and maximizes use of the space segment. By maximizing efficiency of space segment usage, the broadcast stations 23 can be implemented less expensively using less power-consuming components. For example, the antenna at the broadcast station 23 can be very small aperture terminal (VSAT) antenna. The payload on the satellite requires less memory, less processing capability and therefore fewer power sources which reduces payload weight.

Figure 4:
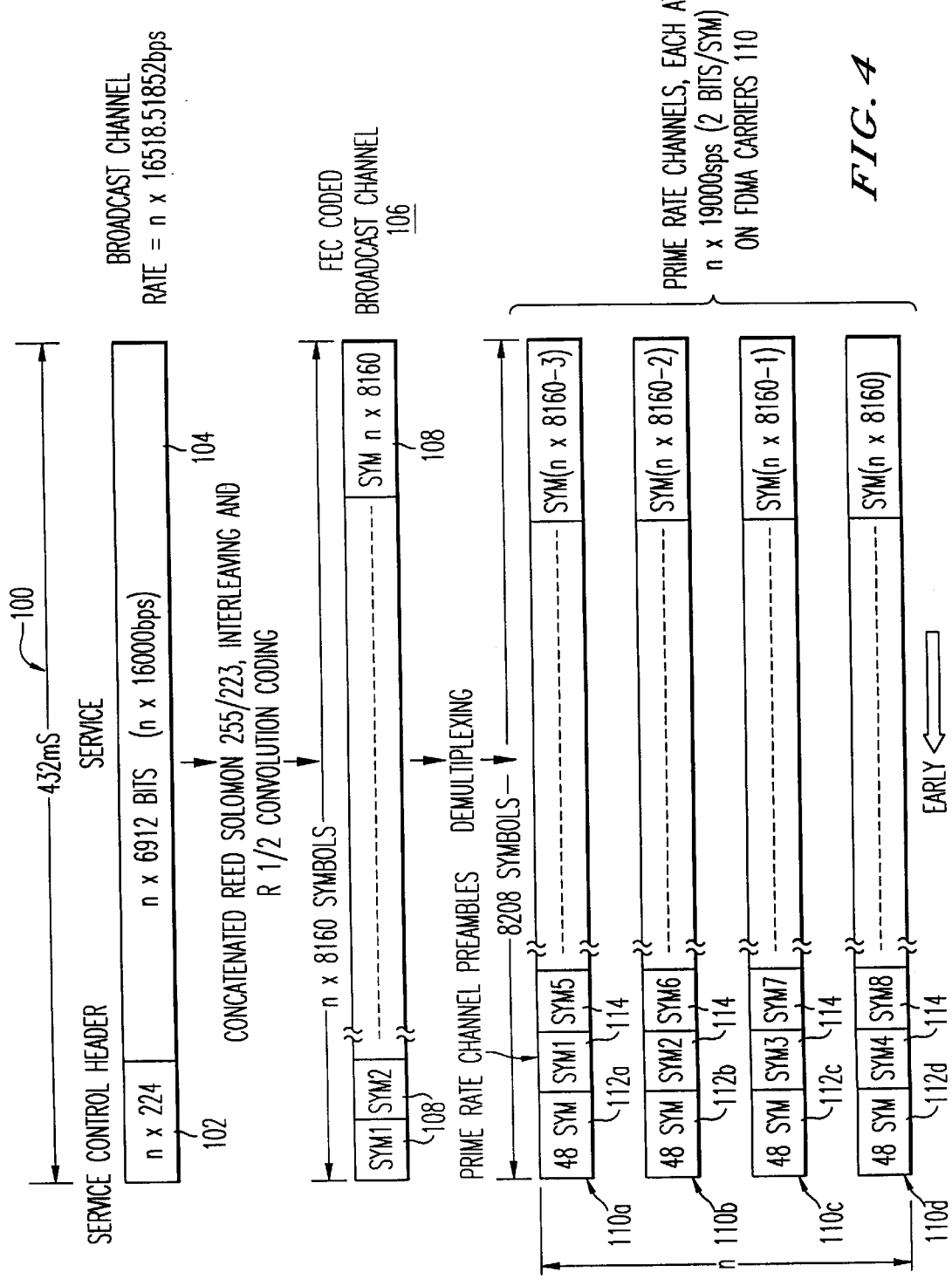
FIG. 4 is a schematic diagram illustrating broadcast segment multiplexing in accordance with an embodiment of the present invention.

A broadcast channel 59 or 67 is characterized by a frame 100 having a period duration of 432 ms, as shown in FIG. 4. This period duration is selected to facilitate use of the MPEG source coder described below; however, the frame paired in the system 10 can be set to a different predetermined value. If the period duration is 432 ms, then each 16 kbps PRI requires 16,000×0.432 seconds=6912 bits per frame. As shown in FIG. 4, a broadcast channel therefore consists of a value n of these 16 kbps PRIs which are carried as a group in the frame 100. As will be described below, these bits are scrambled to enhance demodulation at the radio receivers 29. The scrambling operation also provides a mechanism for encrypting the service at the option of the service provider. Each frame 100 is assigned n×224 bits which correspond to a service control header (SCH), resulting in a total of n×7136 bits per frame and a bit rate of n×(16,518+14/27) bits per second. The purpose of the SCH is to send data to each of the radio receivers 29 tuned to receive the broadcast channel 59 or 67 in order to control reception modes for various multimedia services, to display data and images, to send key information for decryption, to address a specific receiver, among other features.

With continued reference to FIG. 3, the sources 60 and 64 are coded using, for example, MPEG 2.5 Layer 3 coders 62 and 66, respectively. The two sources are subsequently added via a combiner 76 and then processed using a processor at the broadcast station 23 to provide the coded signals in periodic frames of 432 ms, that is, n×7136 bits per frame including the SCH, as indicated by processing module 78 in FIG. 3. The blocks indicated at the broadcast station in FIG. 3 correspond to programmed modules performed by a processor and associated hardware such as digital memory and coder circuits. The bits in the frame 100 are subsequently coded for FEC protection using digital signal processing (DSP) software, application specific integrated circuits (ASICs) and custom large-scale integration (LSI) chips for the two concatenated coding methods. First, a Reed Solomon coder 80a is provided to produce 255 bits for every 223 bits entering the coder. The bits in the frame 100 are then reordered according to a known interleaving scheme, as indicated by reference number 80b. The interleaving coding provides further protection against bursts of error encountered in a transmission since this method spreads damaged bits over several channels. With continued reference to processing module 80, a known convolution coding scheme of constraint length 7 is applied using a Viterbi coder 80c. The Viterbi coder 83c produces two output bits for every input bit, producing as a net result 16320 FEC-coded bits per frame for each increment of 6912 bits per frame applied in the broadcast channel 59. Thus, each FEC-coded broadcast channel (e.g., channel 59 or 67) comprises n×16320 bits of information which have been coded, reordered and coded again such that the original broadcast 16 kbps PRIs are no longer identifiable. The FEC-coded bits, however, are organized in terms of the original 432 ms frame structure. The overall coding rate for error protection is (255/223)×2=2+64/223.

With continued reference to FIG. 3, the n×16320 bits of the FEC-coded broadcast channel frame is subsequently subdivided or demultiplexed using a channel distributor 82 into n parallel prime rate channels (PRCs), each carrying 16320 bits in terms of sets of 8160 two-bit symbols. This process is further illustrated in FIG. 4. The broadcast channel 59 is shown which is characterized by a 432 ms frame 100 having an SCH 102. The remaining portion 104 of the frame consists of n 16 kbps PRIs which corresponds to 6912 bits per frame for each of the n PRIs. The FEC-coded broadcast channel 106 is attained following concatenated Reed Solomon 255/223, interleaving and FEC 1/2 convolution coding described above in connection with module 80. As stated previously, the FEC-coded broadcast channel frame 106 comprises n×16320 bits which correspond to 8160 sets of two-bit symbols, with each symbol being designated by a reference numeral 108 for illustrated purposes. In accordance with the present invention, the symbols are assigned across the PRCs 110 in the manner shown in FIG. 4. Thus, the symbols will be spread on the basis of time and frequency which further reduces errors at the radio receiver caused by interference in transmission. The service provider for broadcast channel 59 has purchased four PRCs for illustrative purposes, whereas the service provider for broadcast channel 67 has purchased six PRCs for illustrative purposes. FIG. 4 illustrates the first broadcast channel 59 and the assignment of symbols 114 across the n=4 PRCs 110a, 110b, 110c and 110d, respectively. To implement recovery of each two-bit symbol 114 set at the receiver, a PRC synchronization header or preamble 112a, 112b, 112c and 112d, respectively, is placed in front of each PRC. The PRC synchronization header (hereinafter generally referred to using reference numeral 112) contains 48 symbols. The PRC synchronization header 112 is placed in front of each group of 8160 symbols, thereby increasing the number of symbols per 432 ms frame to 8208 symbols. Accordingly, the symbol rate becomes 8208/0.432 which equals 19,000 kilosymbols per second (ksym/s) for each PRC 110. The 48 symbol PRC preamble 112 is used essentially for synchronization of the radio receiver PRC clock to recover the symbols from the downlink satellite transmission 27. At the on-board processor 116, the PRC preamble is used to absorb timing differences between the symbol rates of arriving uplink signals and that used on-board to switch the signals and assemble the downlink TDM streams. This is done by adding, subtracting a "0" or neither to each 48 symbol PRC in the rate alignment process used on-board the satellite. Thus, the PRC preambles carried on the TDM downlink has 47, 48 or 49 symbols as determined by the rate alignment process. As shown in FIG. 4, symbols 114 are assigned to consecutive PRCs in a round-robin fashion such that symbol 1 is assigned to PRC 110a, symbol 2 is assigned to PRC 110b, symbol 3 is assigned to PRC 110c, symbol 4 is assigned to PRC 110d, symbol 5 is assigned to PRC 110e, and so on. This PRC demultiplexing process is performed by a processor at the broadcast station 23 and is represented in FIG. 3 as the channel distribution (DEMUX) module 82.

The PRC channel preambles are assigned to mark the beginning of the PRC frames 110a, 110b, 110c and 110d for broadcast channel 59 using the preamble module 84 and adder module 85. The n PRCs are subsequently differentially encoded and then QPSK modulated onto an IF carrier frequency using a bank of QPSK modulators 86 as shown in FIG. 3. Four of the QPSK modulators 86a, 86b, 86c and 86d are used for respective PRCs 110a, 110b, 110c and 110d for broadcast channel 59. Accordingly, there are four PRC IF carrier frequencies constituting the broadcast channel 59. Each of the four carrier frequencies is up-converted to its assigned frequency location in the X-band using an up-converter 88 for transmission to the satellite 25. The up-converted PRCs are subsequently transmitted through an amplifier 90 to the antenna (e.g., a VSAT) 92a and 92b.

In accordance with the present invention, the transmission method employed at a broadcast station 23 incorporates a multiplicity of n Single Channel Per Carrier, Frequency Division Multiple Access (SCPC/FDMA) carriers into the uplink signal 21. These SCPC/FDMA carriers are spaced on a grid of center frequencies which are preferably separated by 38,000 Hertz (Hz) from one another and are organized in groups of 48 contiguous center frequencies or carrier channels. Organization of these groups of 48 carrier channels is useful to prepare for demultiplexing and demodulation processing conducted on-board the satellite 25. The various groups of 48 carrier channels are not necessarily contiguous to one another. The carriers associated with a particular broadcast channel (i.e., channel 59 or 67) are not necessarily contiguous within a group of 48 carrier channels and need not be assigned in the same group of 48 carrier channels. The transmission method described in connection with FIGS. 3 and 4 therefore allows for flexibility in choosing frequency locations and optimizes the ability to fill the available frequency spectrum and to avoid interference with other users sharing the same radio frequency spectrum.

The system 10 is advantageous because it provides a common base of capacity incrementation for a multiplicity of broadcast companies or service providers whereby broadcast channels of various bit rates can be constructed with relative ease and transmitted to a receiver 29. Typical broadcast channel increments or PRIs are preferably 16, 32, 48, 64, 80, 96, 112 and 128 kbps. The broadcast channels of various bit rates are interpreted with relative ease by the radio's receiver due to the processing described in connection with FIG. 4. The size and cost of a broadcast station can therefore be designed to fit the capacity requirements and financial resource limitations of a broadcast company. A broadcast company of meager financial means can install a small VSAT terminal requiring a relatively small amount of power to broadcast a 16 kbps service to its country that is sufficient to carry voice and music having quality far better than that of short-wave radio. On the other hand, a sophisticated broadcast company of substantial financial means can broadcast FM stereo quality with a slightly larger antenna and more power at 64 kbps and, with further increases in capacity, broadcast near compact disc (CD) stereo quality at 96 kbps and full CD stereo quality at 128 kbps.

The frame size, SCH size, preamble size and PRC length described in connection with FIG. 4 are used to realize a number of advantages; however, the broadcast station processing described in connection with FIGS. 3 and 4 is not limited to these values. The frame period of 432 ms is convenient when using an MPEG source coder (e.g., coder 62 or 66). The 224 bits for each SCH 102 is selected to facilitate FEC coding. The 48 symbol PRC preamble 112 is selected to achieve 8208 symbols per PRC 110 to achieve 19,000 ksym/s for each PRC for a simplified implementation of multiplexing and demultiplexing on-board the satellite 25, as described in future detail below. Defining symbols to comprise two-bits is convenient for QPSK modulation (i.e., $2^2=4$). To illustrate further, if phase shift key modulation at the broadcast station 23 uses eight phases as opposed to four phases, then a symbol defined as having three bits would be more convenient since each combination of three bits (i.e., $2^3$) can correspond to one of the eight phases.

Software can be provided at a broadcast station 23 or, if more than one broadcast station exists in the system 10, a regional broadcast control facility (RBCF) 238 (FIG. 12) to assign space segment channel routing via a mission control center (MCC) 240, a satellite control center (SCC) 236 and a broadcast control center (BCC) 244. The software optimizes use of the uplink spectrum by assigning PRC carrier channels 110 wherever space is available in the 48 channel groups. For example, a broadcast station may wish to broadcast a 64 kbps service on four PRC carriers. Due to current spectrum use, the four carriers may not be available in contiguous locations, but rather only in non-contiguous locations within a group of 48 carriers. Further, the RBCF 238 using its MCC and SCC may assign the PRCs to noncontiguous locations among different 48 channel groups. The MCC and SCC software at the RBCF 238 or a single broadcast station 23 can relocate PRC carriers of a particular broadcast service to other frequencies to avoid deliberate (i.e., jamming) or accidental interference on specific carrier locations. A current embodiment of the system has three RBCFs, one for each of the three regional satellites. Additional satellites can be controlled by one of these three facilities.

As will be described in further detail below in connection with on-board satellite processing in FIG. 6, an on-board digitally implemented polyphase processor is used for on-board signal regeneration and digital baseband recovery of the symbols 114 transmitted in the PRCs. The use of groups of 48 carriers spaced on center frequencies separated by 38,000 Hz facilitates processing by the polyphase processor. The software available at the broadcast station 23 or RBCF 238 can perform defragging, that is, defragmentation processing to optimize PRC 110 assignments to uplink carrier channels, that is, groups of 48 carrier channels. The principal behind defragmentation of uplink carrier frequency assignments is not unlike known software for reorganizing files on a computer hard drive which, over time, have been saved in such a piece-meal manner as to be inefficient for data storage. The BCC functions at the RBCF allows the RBCF to remotely monitor and control broadcast stations to assure their operation within assigned tolerances.

Satellite Payload Processing

Figure 5:
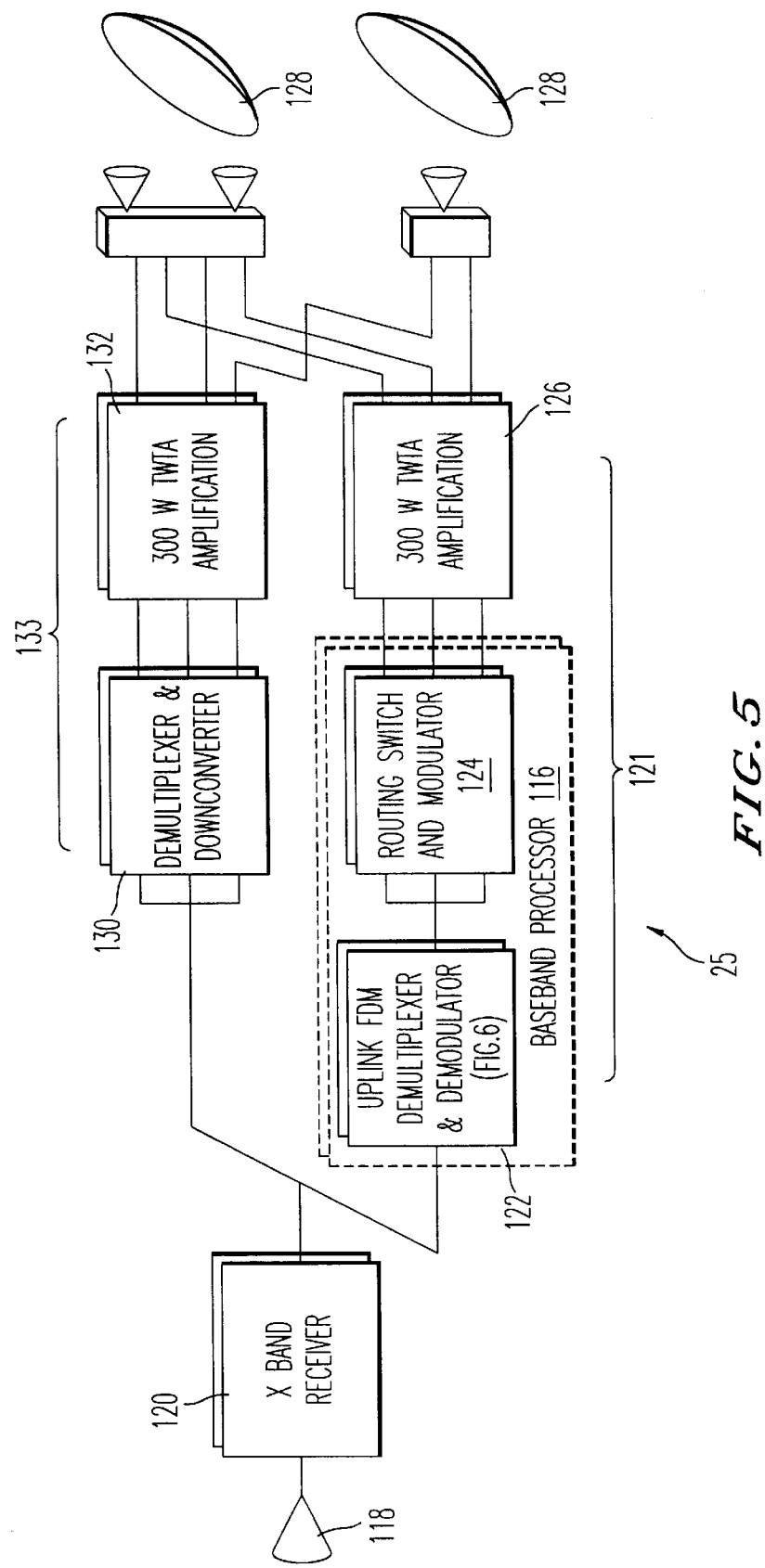
FIG. 5 is a schematic block diagram of an on-board processing payload for a satellite in accordance with an embodiment of the present invention.

The baseband recovery on the satellite is important for accomplishing on-board switching and routing and assembly of TDM downlink carriers, each having 96 PRCs. The TDM carriers are amplified on-board the satellite 25 using single-carrier-per-traveling-wave-tube operation. The satellite 25 preferably comprises eight on-board baseband processors; however, only one processor 116 is shown. Preferably only six of the eight processors are used at a time, the remainder providing redundancy in event of failures and to command them to cease transmission if circumstances require such. A single processor 116 is described in connection with FIGS. 6 and 7. It is to be understood that identical components are preferably provided for each of the other seven processors 116. With reference to FIG. 5, the coded PRC uplink carriers 21 are received at the satellite 25 by an X-band receiver 120. The overall uplink capacity is preferably between 288 and 384 PRC uplink channels of 16 kbps each (i.e., 6×48 carriers if six processors 116 are used, or 8×48 carriers if all eight processors 116 are used). As will be described in further detail below, 96 PRCs are selected and multiplexed for transmission in each downlink beam 27 onto a carrier of approximately 2.5 MHz bandwidth.

Each uplink PRC channel can be routed to all, some or none of the downlink beams 27. The order and placement of PRCs in a downlink beam is programmable and selectable from a telemetry, range and control (TRC) facility 24 (FIG. 1). Each polyphase demultiplexer and demodulator 122 receives the individual FDMA uplink signals in groups of 48 contiguous channels and generates a single analog signal on which the data of the 48 FDMA signals is time multiplexed, and performs a high speed demodulation of the serial data as described in further detail below in connection with FIG. 6. Six of these polyphase demultiplexer and demodulators 122 operate in parallel to process 288 FDMA signals. A routing switch and modulator 124 selectively directs individual channels of the six serial data streams into all, some or none of the downlink signals 27 and further modulates and up-converts the three downlink TDM signals 27. Three traveling wave tube amplifiers (TWTA) 126 individually amplify the three downlink signals, which are radiated to the earth by L-band transmit antennas 128.

The satellite 25 also contains three transparent payloads, each comprising a demultiplexer and down-converter 130 and an amplifier group 132 configured in a conventional "bent pipe" signal path which converts the frequency of input signals for retransmission. Thus, each satellite 25 in the system 10 is preferably equipped with two types of communication payloads. The first type of on-board processing payload is described with reference to FIGS. 5, 6 and 7. The second type of communication payload is the transparent payload which converts uplink TDM carriers from frequency locations in the uplink X-band spectrum to frequency locations in the L-band downlink spectrum. The transmitted TDM stream for the transparent payload is assembled at a broadcast station 23, sent to the satellite 25, received and frequency converted to a downlink frequency location using module 130, amplified by a TWTA in module 132 and transmitted to one of the beams. To a radio receiver 29, the TDM signals appear identical whether they are from the on-board processing payload indicated at 121 or the transparent payload indicated at 133. The carrier frequency locations of each type of payload 121 and 133 are spaced on separate grids of 920 kHz spacing which are interlaced between one another in a bisected manner so that the carrier locations of a mix of signals from both types of payloads 121 and 133 are on 460 kHz spacings.

The on-board demultiplexer and demodulator 122 will now be described in further detail with reference to FIG. 6. As shown in FIG. 6, SCPC/FDMA carriers, each of which is designated with reference numeral 136, are assigned to groups of 48 channels. One group 138 is shown in FIG. 6 for illustrative purposes. The carriers 136 are spaced on a grid of center frequencies separated by 38 kHz. This spacing determines design parameters of the polyphase demultiplexers. For each satellite 25, preferably 288 uplink PRC SCPC/FDMA carriers can be received from a number of broadcast stations 23. Six polyphase demultiplexers and demodulators 122 are therefore preferably used. An on-board processor 116 accepts these PRC SCPC/FDMA uplink carriers 136 and converts them into three downlink TDM carriers, each carrying 96 of the PRCs in 96 time slots.

The 288 carriers are received by an uplink global beam antenna 118 and each group of 48 channels is frequency converted to an intermediate frequency (IF) which is then filtered to select a frequency band occupied by that particular group 138. This processing takes places in the receiver 120. The filtered signal is then supplied to an analog-to-digital (A/D) converter 140 before being supplied as an input to a polyphase demultiplexer 144. The demultiplexer 144 separates the 48 SCPC/FDMA channels 138 into a time division multiplexed analog signal stream comprising QPSK modulated symbols that sequentially present the content of each of 48 SCPC/FDMA channels at the output of the demultiplexer 144. This TDM analog signal stream is routed to a digitally implemented QPSK demodulator and differential decoder 146. The QPSK demodulator and differential decoder 146 sequentially demodulates the QPSK modulated symbols into digital baseband bits. Demodulation processing requires symbol timing and carrier recovery. Since the modulation is QPSK, baseband symbols containing two-bits each are recovered for each carrier symbol. The demultiplexer 144 and demodulator and decoder 146 will hereinafter be referred to as a demultiplexer/demodulator (D/D) 148. The D/D is preferably accomplished using high speed digital technology using the known Polyphase technique to demultiplex the uplink carriers 21. The QPSK demodulator is preferably a serially-shared, digitally-implemented demodulator for recovering the baseband two-bit symbols. The recovered symbols 114 from each PRC carrier 110 are subsequently differentially decoded to recover the original PRC symbols 108 applied at the input encoders, that is, the channel distributors 82 and 98 in FIG. 3, at the broadcast station 23. The satellite 25 payload preferably comprises six digitally implemented, 48 carrier D/Ds 148. In addition, two spare D/Ds 148 are provided in the satellite payload to replace any failed processing units.

Figure 6:
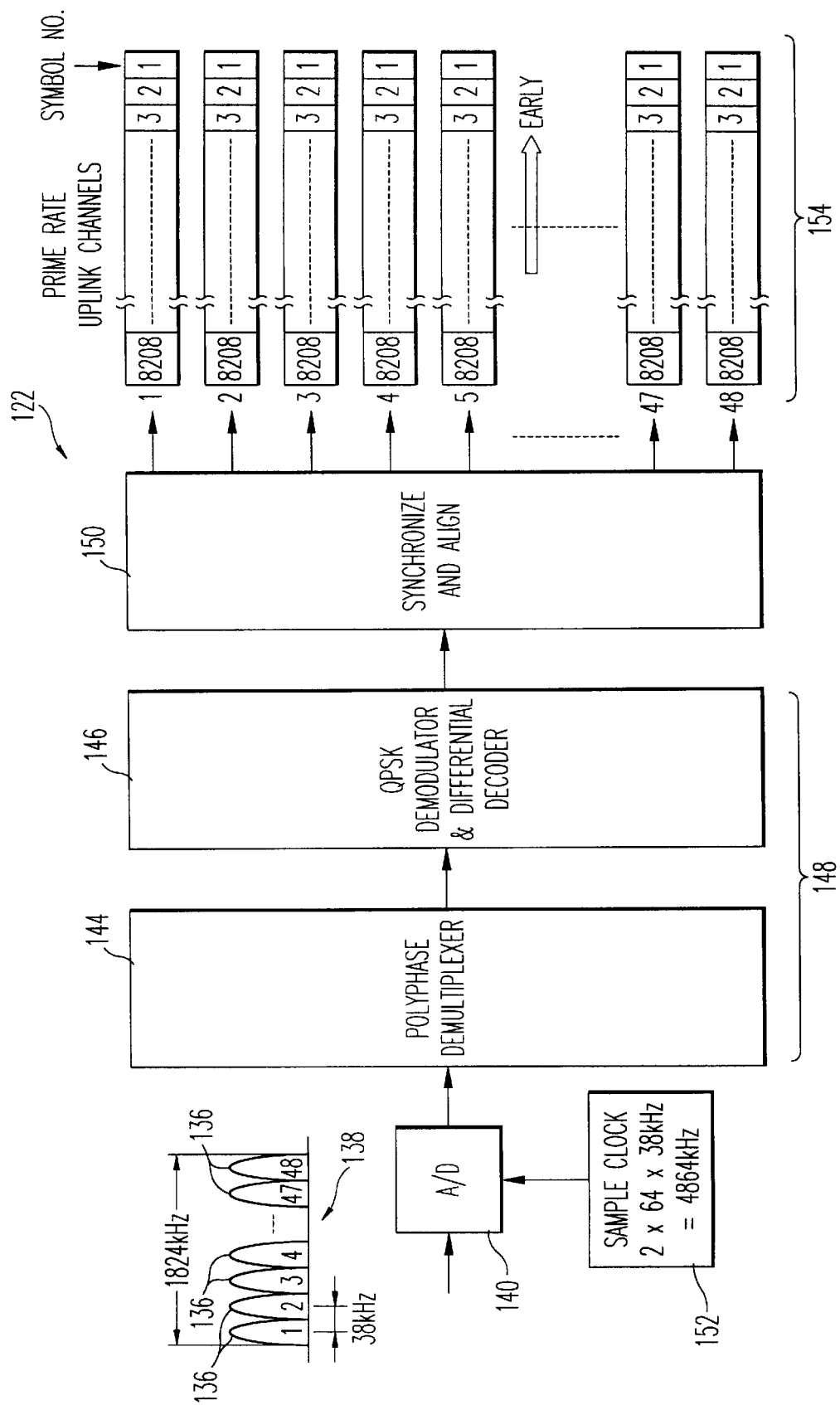
FIG. 6 is a schematic diagram illustrating on-board satellite demultiplexing and demodulation processing in accordance with an embodiment of the present invention.

With continued reference to FIG. 6, the processor 116 is programmed in accordance with a software module indicated at 150 to perform a synchronization and rate alignment function on the time division multiplexed symbol stream generated at the output of the QPSK demodulator and differential decoder 146. The software and hardware components (e.g., digital memory buffers and oscillators) of the rate alignment module 150 in FIG. 6 are described in more detail with reference to FIG. 7. The rate alignment module 150 compensates for clock rate differences between the on-board clock 152 and that of the symbols carried on the individual uplink PRC carriers 138 received at the satellite 25. The clock rates differ because of different clock rates at different broadcast stations 23, and different Doppler rates from different locations caused by motion of the satellite 25. Clock rate differences attributed to the broadcast stations 23 can originate in clocks at a broadcast station itself or in remote clocks, the rates of which are transferred over terrestrial links between a broadcast studio and a broadcast station 23.

The rate alignment module 150 adds or removes a "0" value symbol, or does neither operation in the PRC header portion 112 of each 432 ms recovered frame 100. A "0" value symbol is a symbol that consists of a bit value 0 on both the I and Q channels of the QPSK-modulated symbol. The PRC header 112 comprises 48 symbols under normal operating conditions and consists of an initial symbol of "0" value, followed by 47 other symbols. When the symbol times of the uplink clock, which is recovered by the QPSK demodulator 146 along with the uplink carrier frequency, and those of the on-board clock 152 are synchronized, no change is made to the PRC preamble 112 for that particular PRC 110. When the arriving uplink symbols have a timing that lags behind the on-board clock 152 by one symbol, a "0" symbol is added to the start of the PRC preamble 112 for the PRC currently being processed, yielding a length of 49 symbols. When the arriving uplink symbols have a timing that leads the on-board clock 152 by one symbol, a "0" symbol is deleted at the start of the PRC preamble 112 of the current PRC being processed, yielding a length of 47 symbols.

As stated previously, the input signal to the rate alignment module 150 comprises the stream of the recovered baseband two-bit symbols for each received uplink PRC at their individual original symbol rates. There are 288 such streams issued from the D/D 148 corresponding to each of the six active processors 116. The action involving only one D/D 148 and one rate alignment module 150 is described, although it is to be understood that the other five active processors 116 on the satellite perform similar functions.

Figure 8:
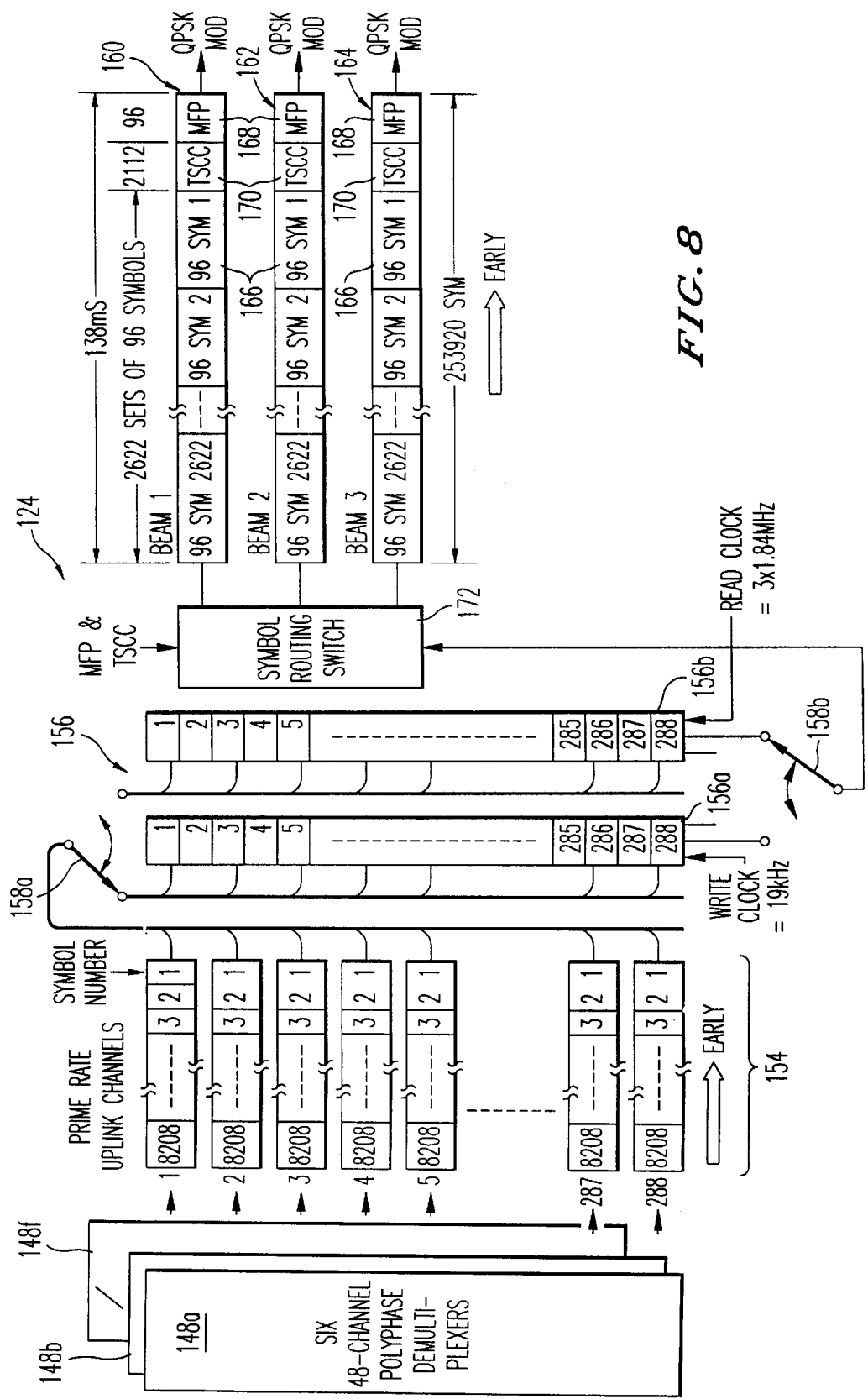
FIG. 8 is a schematic diagram illustrating on-board satellite switching and time division multiplexing operations in accordance with an embodiment of the present invention.

To rate align uplink PRC symbols to the on-board clock 152, three steps are performed. First, the symbols are grouped in terms of their original 8208 two-bit symbol PRC frames 110 in each buffer 149 and 151 of a ping-pong buffer 153. This requires correlation of the PRC header 112 (which contains a 47 symbol unique word) with a local stored copy of the unique word in correlators indicated at 155 to locate the symbols in a buffer. Second, the number of on-board clock 152 ticks between correlation spikes is determined and used to adjust the length of the PRC header 112 to compensate for the rate difference. Third, the PRC frame, with its modified header, is clocked at the on-board rate into its appropriate location in a switching and routing memory device 156 (FIG. 8).

PRC symbols enter the ping-pong buffer pair 153 at the left. The ping-pong action causes one buffer 149 or 151 to fill at the uplink clock rate, and the other buffer to simultaneously empty at the on-board clock rate. The roles reverse from one frame to the next and cause continuous flow between input and output of the buffer 149 and 151. Newly arriving symbols are written to the buffer 149 or 151 to which they happen to be connected. Writing continues to fill the buffer 149 or 151 until the correlation spike occurs. Writing then stops, and the input and output switches 161 and 163 switch to the reverse state. This captures an uplink PRC frame so that its 48 header symbols reside in the 48 symbol slots with one slot left unfilled at the output end of the buffer and the 8160 data symbols fill the first 8160 slots. The contents of the subject buffer are immediately read to the output thereof at the on-board clock rate. The number of symbols read out are such that the PRC header contains 47, 48 or 49 symbols. A "0" value symbol is removed or added at the start of the PRC header to make this adjustment. The header length 112 is controlled by a signal coming from a frame symbol counter 159 which counts the number of on-board clock rate symbols that will fall in a PRC frame period to determine the header length. The ping-pong action alternates the roles of the buffers.

To perform the count, the frame correlation spikes coming from the buffer correlators 155, as PRC frames fill the buffers 149 and 151, are smoothed by a synch pulse oscillator (SPC) 157. The smoothed sync pulses are used to count the number of symbol epochs per frame. The number will be 8207, 8208 or 8209 indicating whether the PRC header should be 47, 48 or 49 symbols long, respectively. This information causes the proper number of symbols to come from the frame buffers to maintain symbol flow synchronously with the on-board clock and independently of earth terminal origin.

For the rate differences anticipated over the system 10, the run times between preamble 112 modifications are relatively long. For instance, clock rate differences of $10^{-6}$ will elicit PRC preamble corrections on the average of one every 123 PRC frames. The resulting rate adjustments cause the symbol rates of the PRCs 110 to be precisely synchronized to the on-board clock 152. This allows routing of the baseband bit symbols to the proper locations in a TDM frame. The synchronized PRCs are indicated generally at 154 in FIG. 6. The on-board routing and switching of these PRCs 154 into TDM frames will now be described with reference to FIG. 8.

Figure 7:
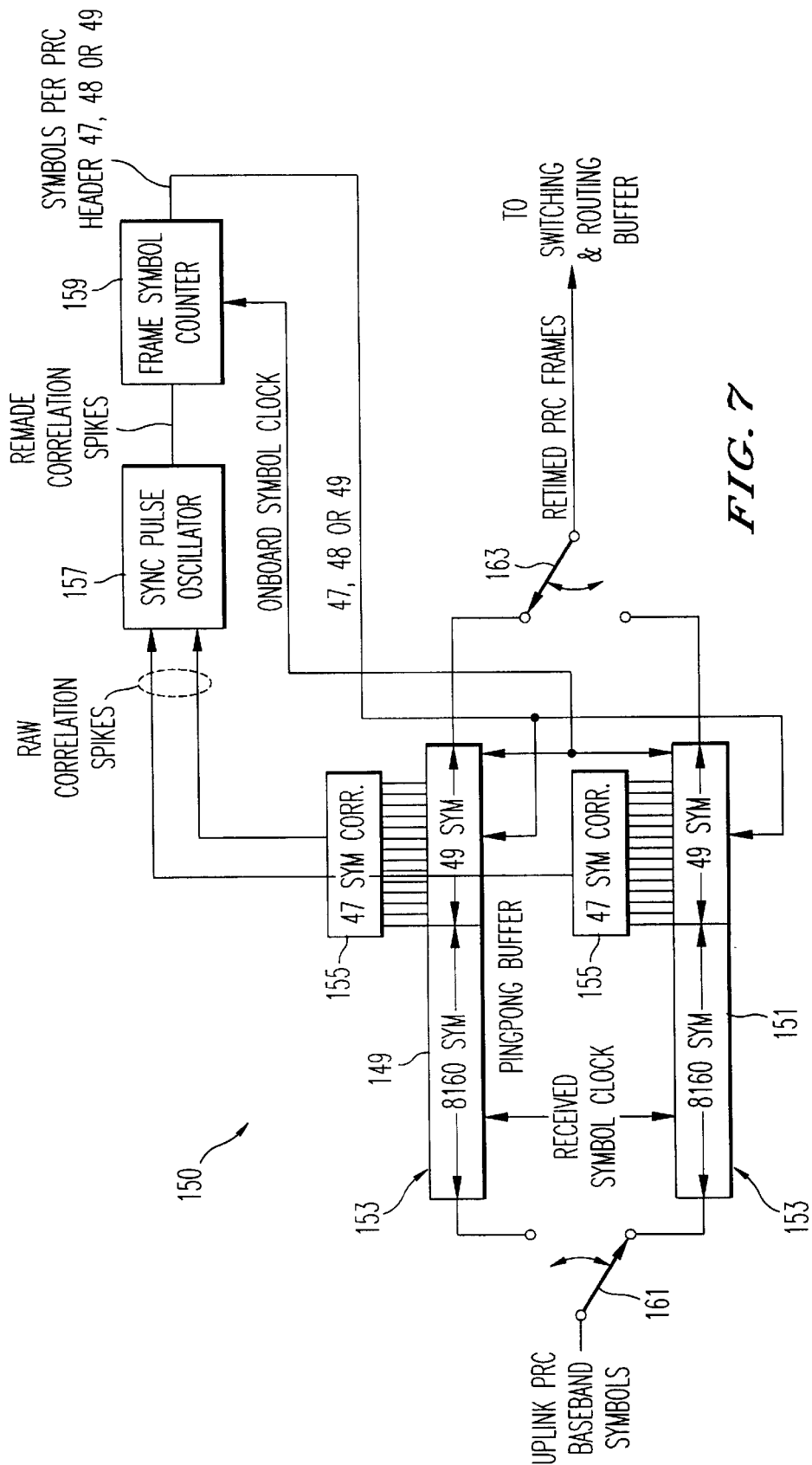
FIG. 7 is a schematic diagram illustrating on-board satellite rate alignment processing in accordance with an embodiment of the present invention.

FIG. 6 illustrates PRC processing by a single D/D 148. Similar processing is performed by the other five active D/Ds on-board the satellite. The PRCs emanating from each of the six D/Ds 148, having been synchronized and aligned, occur in a serial stream having a symbol rate of 48×19,000 which equals 912,000 symbols per second for each D/D 148. The serial stream from each D/D 148 can be demultiplexed into 48 parallel PRC streams having rates of 19,000 symbols per second, as shown in FIG. 7. The aggregate of the PRC streams coming from all six D/Ds 148 on-board the satellite 25 is 288, with each D/D 148 carrying 19,000 sym/s streams. The symbols therefore have epochs or periods of 1/19,000 seconds which equals approximately 52.63 microseconds duration.

As shown in FIG. 8, 288 symbols are present at the outputs of the six D/Ds 148a, 148b, 148c, 148d, 148e and 148f for every uplink PRC symbol epoch. Once each PRC symbol epoch, 288 symbol values are written into a switching and routing memory 156. The contents of the buffer 156 are read into three downlink TDM frame assemblers 160, 162 and 164. Using a routing and switching component designated as 172, the contents of each of the 288 memory locations are read in terms of 2622 sets of 96 symbols to each of the three TDM frames in assemblers 160, 162 and 164 in an epoch of 136.8 ms which occurs once every TDM frame period or 138 ms. The scan rate or 136.8/2622 is therefore faster than the duration of a symbol. The routing switch and modulator 124 comprises a ping-pong memory configuration indicated generally at 156 and comprising buffers 156a and 156b, respectively. The 288 uplink PRCs indicated at 154 are supplied as input to the routing switch and modulator 124. The symbols of each PRC occur at a rate of 19,000 symbols per second corrected to the on-board clock 152 timing. The PRC symbols are written in parallel at the 19,000 Hz clock rate into 288 positions in the ping-pong memory 156a or 156b serving as the input. At the same time, the memory serving as the output 156b or 156a, respectively, is reading the symbols stored in the previous frame into the three TDM frames at a read rate of 3×1.84 MHz. This latter rate is sufficient to allow the simultaneous generation of the three TDM parallel streams, one directed to each of three beams. Routing of the symbols to their assigned beam is controlled by a symbol routing switch 172. This switch can route a symbol to any one, two or three of the TDM streams. Each TDM stream occurs at a rate of 1.84 Msym/s. The output memory is clocked for an interval of 136.8 ms and pauses for 1.2 ms to allow insertion of the 96 symbol MFP and 2112 symbol TSCC. Note that for every symbol that is read into more than one TDM stream, there is an off-setting uplink FDM PRC channel that is not used and is skipped. The ping-pong memory buffers 156a and 156b exchange roles from frame to frame via the switch components 158a and 158b.

With continued reference to FIG. 8, sets of 96 symbols are transferred to 2622 corresponding slots in each TDM frame. The corresponding symbols (i.e., the ith symbols) for all 96 uplink PRCs are grouped together in the same TDM frame slot as illustrated by the slot 166 for symbol 1. The contents of the 2622 slots of each TDM frame are scrambled by adding a pseudorandom bit pattern to the entire 136.8 ms epoch. In addition, a 1.2 ms epoch is appended at the start of each TDM frame to insert a master frame preamble (MFP) of 96 symbols and a TSCC of 2112 symbols, as indicated at 168 and 170, respectively. The sum of the 2622 time slots, each carrying 96 symbols, and the symbols for the MFP and TSCC is 253,920 symbols per TDM frame, resulting in a downlink symbol rate of 1.84 Msym/s.

The routing of the PRC symbols between the outputs of the six D/Ds 148A, 148B, 148C, 148D, 148E and 148F and the inputs to the TDM frame assemblers 160, 162 and 164 is controlled by an on-board switching sequence unit 172 which stores instructions sent to it over a command link from the SCC 238 (FIG. 12) from the ground. Each symbol originating from a selected uplink PRC symbol stream can be routed to a time slot in a TDM frame to be transmitted to a desired destination beam 27. The method of routing is independent of the relationships between the time of occurrence of symbols in various uplink PRCs and the occurrence of symbols in the downlink TDM streams. This reduces the complexity of the satellite 25 payload. Further, a symbol originating from a selected uplink PRC can be routed to two or three destination beams via the switch 158.

Radio Receiver Operation

A radio receiver 29 for use in the system 10 will now be described with reference to FIG. 9. The radio receiver 29 comprises an radio frequency (RF) section 176 having an antenna 178 for L-band electromagnetic wave reception, and prefiltering to select the operating band of the receiver (e.g., 1452 to 1492 MHz). The RF section 176 further comprises a low noise amplifier 180 which is capable of amplifying the receive signal with minimum self-introduced noise and of withstanding interference signals that may come from another service sharing the operating band of the receiver 29. A mixer 182 is provided to down-convert the received spectrum to an intermediate frequency (IF). A high performance IF filter 184 selects the desired TDM carrier bandwidth from the output of the mixer 182 and a local oscillator synthesizer 186, which generates the mixing input frequencies needed to down-convert the desired signal to the center of the IF filter. The TDM carriers are located on center frequencies spaced on a grid having 460 kHz separations. The bandwidth of the IF filter 184 is approximately 2.5 MHz. The separation between carriers is preferably at least seven or eight spaces or approximately 3.3 MHz. The RF section 176 is designed to select the desired TDM carrier bandwidth with a minimum of internally-generated interference and distortion and to reject unwanted carriers that can occur in the operating band from 152 to 192 MHz. In most areas of the world, the levels of unwanted signals are nominal, and typically the ratios of unwanted signals to desired signals of 30 to 40 dB provides sufficient protection. In some areas, operations near high power transmitters (e.g., in the vicinity of terrestrial microwave transmitters for public switched telephone networks or other broadcast audio services) requires a front end design capable of better protection ratios. The desired TDM carrier bandwidth retrieved from the downlink signal using the RF section 176 is provided to an A/D converter 188 and then to a QPSK demodulator 190. The QPSK demodulator 190 is designed to recover the TDM bit stream transmitted from satellite 25, that is, via the on-board processor payload 121 or the on-board transparent payload 133, on a selected carrier frequency.

The QPSK demodulator 190 is preferably implemented by first converting the IF signal from the RF section 176 into a digital representation using the A/D converter 188, and then implementing the QPSK using a known digital processing method. Demodulation preferably uses symbol timing and carrier frequency recover and decision circuits which sample and decode the symbols of the QPSK modulated signal into the baseband TDM bit stream.

The A/D converter 188 and QPSK demodulator 190 are preferably provided on a channel recovery chip 187 for recovering the broadcast channel digital baseband signal from the IF signals recovered by the RF/IF circuit board 176. The channel recovery circuit 187 comprises a TDM synchronizer and predictor module 192, a TDM demultiplexer 194, a PRC synchronizer alignment and multiplexer 196, the operations of which will be described in further detail in connection with FIG. 10. The TDM bit stream at the output of the QPSK demodulator 190 is provided to a MFP synchronization correlator 200 in the TDM synchronizer and predictor module 192. The correlator 200 compares the bits of the received stream to a stored pattern. When no signal has previously been present at the receiver, the correlator 200 first enters a search mode in which it searches for the desired MFP correlation pattern without any time gating or aperture limitation applied to its output. When the correlator discovers a correlation event, it enters a mode wherein a gate opens at a time interval in which a next correlation event is anticipated. If a correlation event occurs again within the predicted time gate epoch, the time gating process is repeated. If correlation occurs for five consecutive time frames, for example, synchronization is declared to have been determined in accordance with the software. The synchronization threshold, however, can be changed. If correlation has not occurred for the minimum number of consecutive time frames to reach the synchronization threshold, the correlator continues to search for the correlation pattern.

Assuming that synchronization has occurred, the correlator enters a synchronization mode in which it adjusts its parameters to maximize probability of continued synchronization lock. If correlation is lost, the correlator enters a special predictor mode in which it continues to retain synchronization by prediction of the arrival of the next correlation event. For short signal dropouts (e.g., for as many as ten seconds), the correlator can maintain sufficiently accurate synchronization to achieve virtually instantaneous recovery when the signal returns. Such rapid recovery is advantageous because it is important for mobile reception conditions. If, after a specified period, correlation is not reestablished, the correlator 200 returns to the search mode. Upon synchronization to the MFP of the TDM frame, the TSCC can be recovered by the TDM demultiplexer 194 (block 202 in FIG. 10). The TSCC contains information identifying the program providers carried in the TDM frame and in which locations of the 96 PRCs each program provider's channel can be found. Before any PRCs can be demultiplexed from the TDM frame, the portion of the TDM frame carrying the PRC symbols is preferably descrambled. This is done by adding the same scrambling pattern at the receiver 29 that was added to the PRC portion of the TDM frame bit stream on-board the satellite 25. This scrambling pattern is synchronized by the TDM frame MFP.

The symbols of the PRCs are not grouped contiguously in the TDM frame, but are spread over the frame. There are 2622 sets of symbols contained in the PRC portion of the TDM frame. In each set, there is one symbol for each PRC in a position which is numbered in ascending order from 1 to 96. Thus, all symbols belonging to PRC 1 are in the first position of all 2622 sets. Symbols belonging to PRC 2 are in the second position of all 2622 sets, and so on, as shown in block 204. This arrangement for numbering and locating the symbols of the PRCs in the TDM frame, in accordance with the present invention, minimizes the size of the memory for performing the switching and routing on-board the satellite and for demultiplexing in the receiver. As shown in FIG. 9, the TSCC is recovered from the TDM demultiplexer 194 and provided to the controller 220 at the receiver 29 to recover the n PRCs for a particular broadcast channel. The symbols of the n PRCs associated with that broadcast channel are extracted from the unscrambled TDM frame time slot locations identified in the TSCC. This association is performed by a controller contained in the radio and is indicated generally at 205 in FIG. 10. The controller 220 accepts a broadcast selection identified by the radio operator, combines this selection with the PRC information contained in the TSCC, and extracts and reorders the symbols of the PRCs from the TDM frame to restore the n PRCs.

Figure 9:
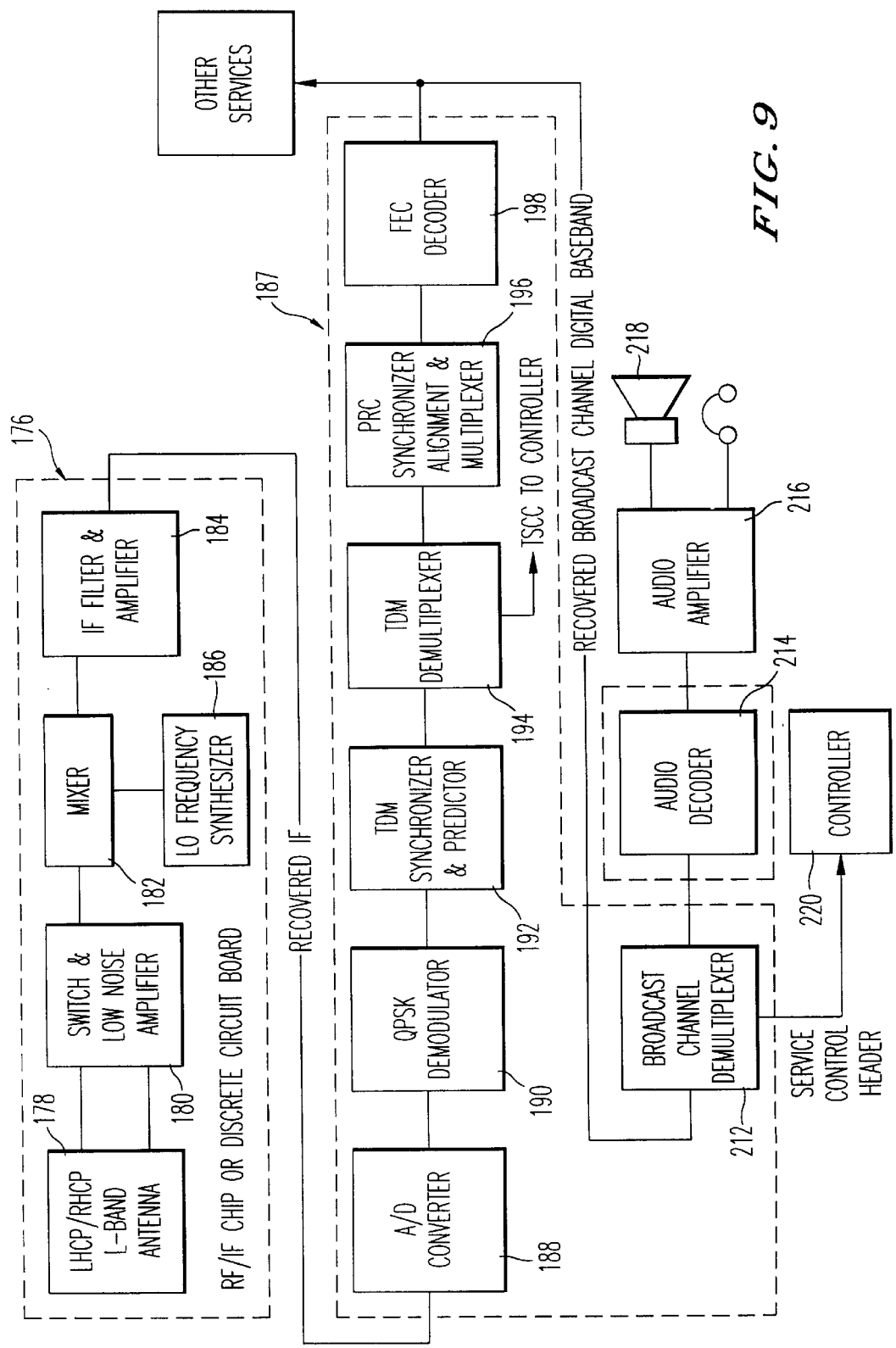
FIG. 9 is a schematic block diagram of a radio receiver for use in the system depicted in FIG. 1 and constructed in accordance with an embodiment of the present invention.
Figure 10:
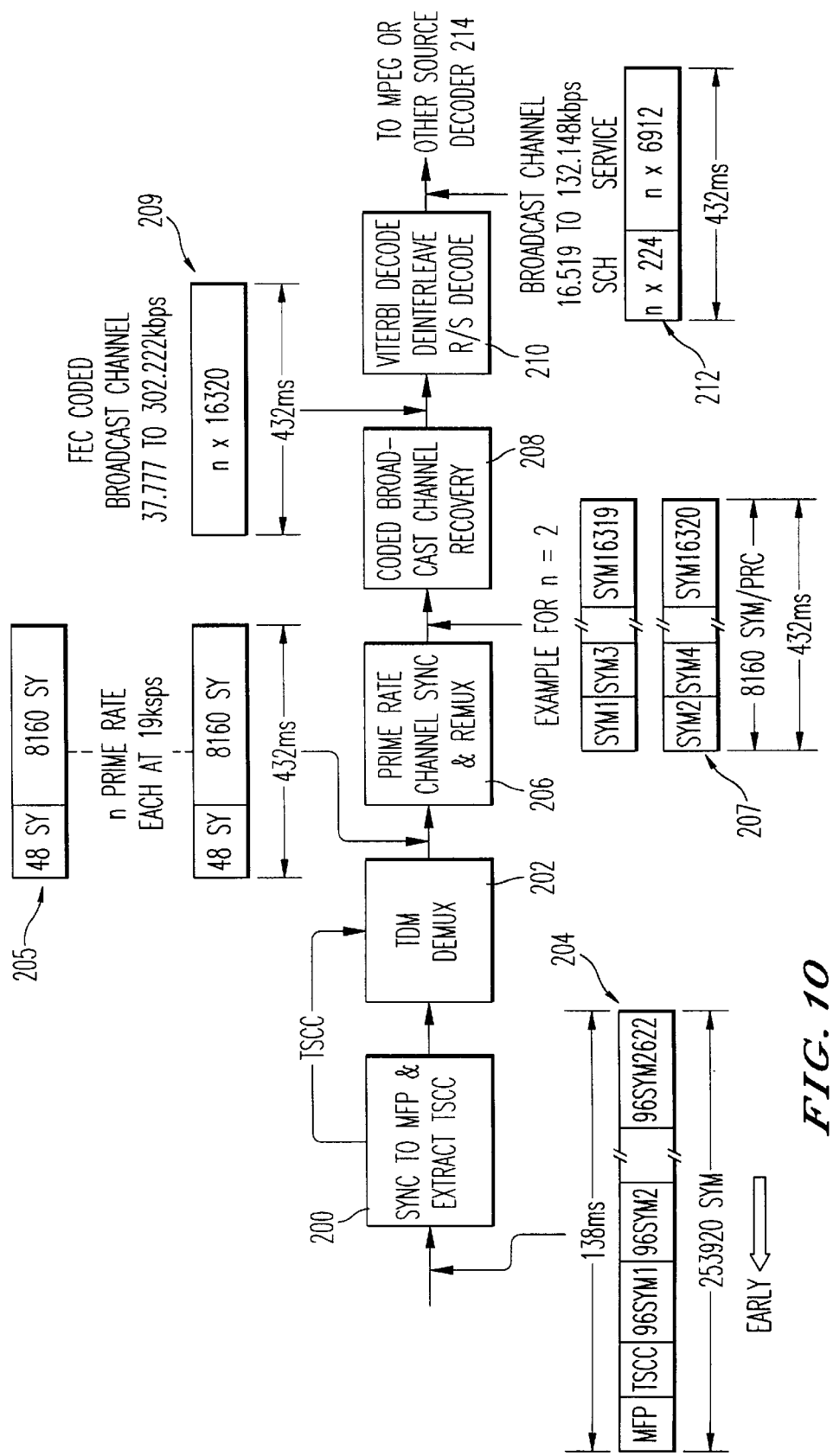
FIG. 10 is a schematic diagram illustrating receiver synchronization and demultiplexing operations in accordance with an embodiment of the present invention.

With reference to blocks 196 and 206, respectively, in FIGS. 9 and 10, the symbols of each of the n PRCs associated with a broadcast channel selected by the radio operator are remultiplexed into an FEC-coded broadcast channel (BC) format. Before the remultiplexing is accomplished, the n PRCs of a broadcast channel are realigned. Realignment is useful because reclocking of symbol timing encountered in multiplexing, demultiplexing and on-board rate alignment in passage over the end-to-end link in system 10 can introduce a shift of as many as four symbols in the relative alignment of the recovered PRC frames. Each of the n PRCs of a broadcast channel has a 48 symbol preamble, followed by 8160 coded PRC symbols. To recombine these n PRCs into the broadcast channel, synchronization is performed to the 47, 48 or 49 symbol header of each of the PRCs. The length of the header depends on the timing alignment performed on the uplink PRCs on the satellite 25. Synchronization is accomplished using a preamble correlator operating on the 47 most recently received symbols of the PRC header for each of the n PRCs. The preamble correlator detects incidents of correlation and emits a single symbol duration correlation spike. Based on the relative time of occurrence of the correlation spikes for the n PRCs associated with the broadcast channel, and operating in conjunction with alignment buffers having a width of four symbols, the symbol content of the n PRCs (e.g., as indicated at 207) can be precisely aligned and remultiplexed to recover the FEC-coded broadcast channel (e.g., as indicated at 207). Remultiplexing of the n PRCs to reform the FEC-coded broadcast channel preferably requires that the symbol spreading procedure used at the broadcast station 23 for demultiplexing the FEC-coded broadcast channel into the PRCs be performed in the reverse order, as indicated in blocks 206 and 208 of FIG. 10.

Figure 11:
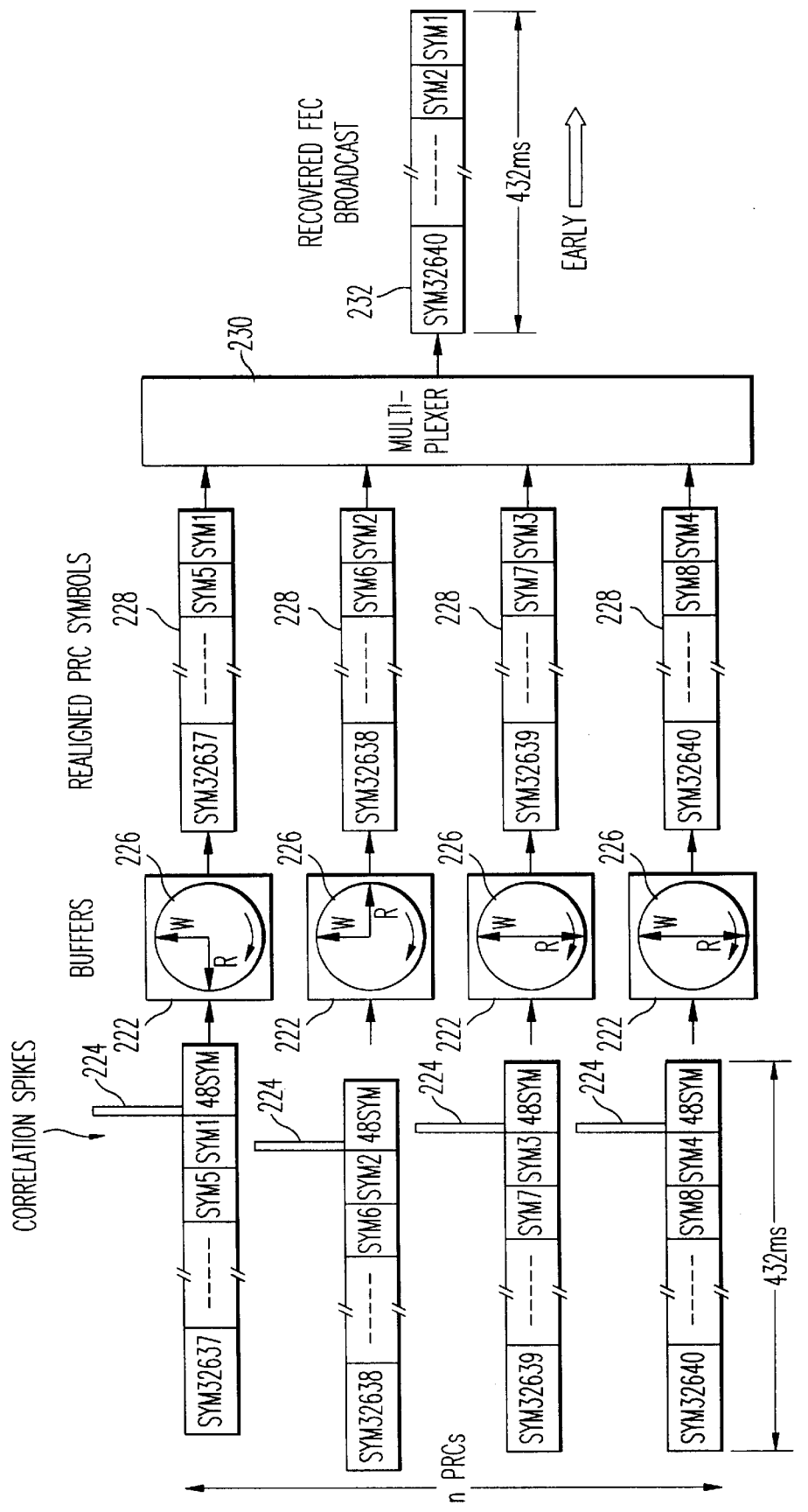
FIG. 11 is a schematic diagram illustrating synchronization and multiplexing operations for recovering coded broadcast channels at a receiver in accordance with an embodiment of the present invention.

FIG. 11 illustrates how a broadcast channel, comprising four PRCs, for example, is recovered at the receiver (block 196 in FIG. 9). At the left, four demodulated PRCs are shown arriving. Due to reclocking variations, and different time delays encountered from the broadcast station through the satellite to the radio, up to four symbols of relative offset can occur among the n PRCs constituting a broadcast channel. The first step in recovery is to realign the symbol content of these PRCs. This is done by a set of FIFO buffers each having a length equal to the range of variation. Each PRC has its own buffer 222. Each PRC is first supplied to a PRC header correlator 226 that determines the instant of arrival. The arrival instants are shown by a correlation spike 224 for each of the four PRCs in the illustration. Writing (W) starts into each buffer 222 immediately following the instant of correlation and continues thereafter until the end of the frame. To align the symbols to the PRCs, reading (R) from all of the buffers 222 starts at the instant of the last correlation event. This causes the symbols of all PRCs to be synchronously read out in parallel at the buffer 222 outputs (block 206). The realigned symbols 228 are next multiplexed via a multiplexer 230 into a single serial stream that is the recovered coded broadcast channel 232 (block 208).

Due to on-board clock 152 rate alignment, the length of the PRC header may be 47, 48 or 49 symbols long. This variation is eliminated in the correlator 226 by using only the last 47 symbols to arrive to detect the correlation event. These 47 symbols are specially selected to yield optimum correlation detection.

With reference to block 198 and 210 of FIGS. 9 and 10 respectively, the FEC-coded broadcast channel is subsequently provided to the FEC processing module 210. Most of the errors encountered in transmission between the location of the coders and the decoders is corrected by FEC processing. FEC processing preferably employs a Viterbi Trellis Decoder, followed by deinterleaving and then a Reed Solomon decoder. FEC processing recovers the original broadcast channel comprising n×16 kbps channel increments and its n×224 bit SCH (block 212).

The n×16 kbps segment of the broadcast channel is provided to a decoder such as MPEG 2.5 Layer 3 source decoder 214 for conversion back to audio signals. Thus, receiver processing is available using a low cost radio for broadcast channel reception from satellites. Since the transmissions of the broadcast programs via satellites 25 is digital, a number of other services are supported by the system 10 which are also expressed in digital format. As stated previously, the SCH contained in the broadcast channels provides a control channel for a wide variety of future service options. Thus, chip sets can be produced to implement these service options by making the entire TDM bit stream and its raw demodulated format, the demultiplexed TSCC information bits, and the recovered error corrected broadcast channel available. Radio receivers 29 can also be provided with an identification code for uniquely addressing each radio. The code can be accessed by means of bits carried in a channel of the SCH of the broadcast channel. For mobile operation using the radio receiver 29 in accordance with the present invention, the radio is configured to predict and recover substantially instantaneously the locations of MFP correlation spikes to an accuracy of ¼th symbol for intervals of as many as ten seconds. A symbol timing local oscillator having a short time accuracy of better than one part per 100,000,000 is preferably installed in the radio receiver, particularly for a hand-held radio 29b.

System for Managing Satellite and Broadcast Stations

Figure 12:
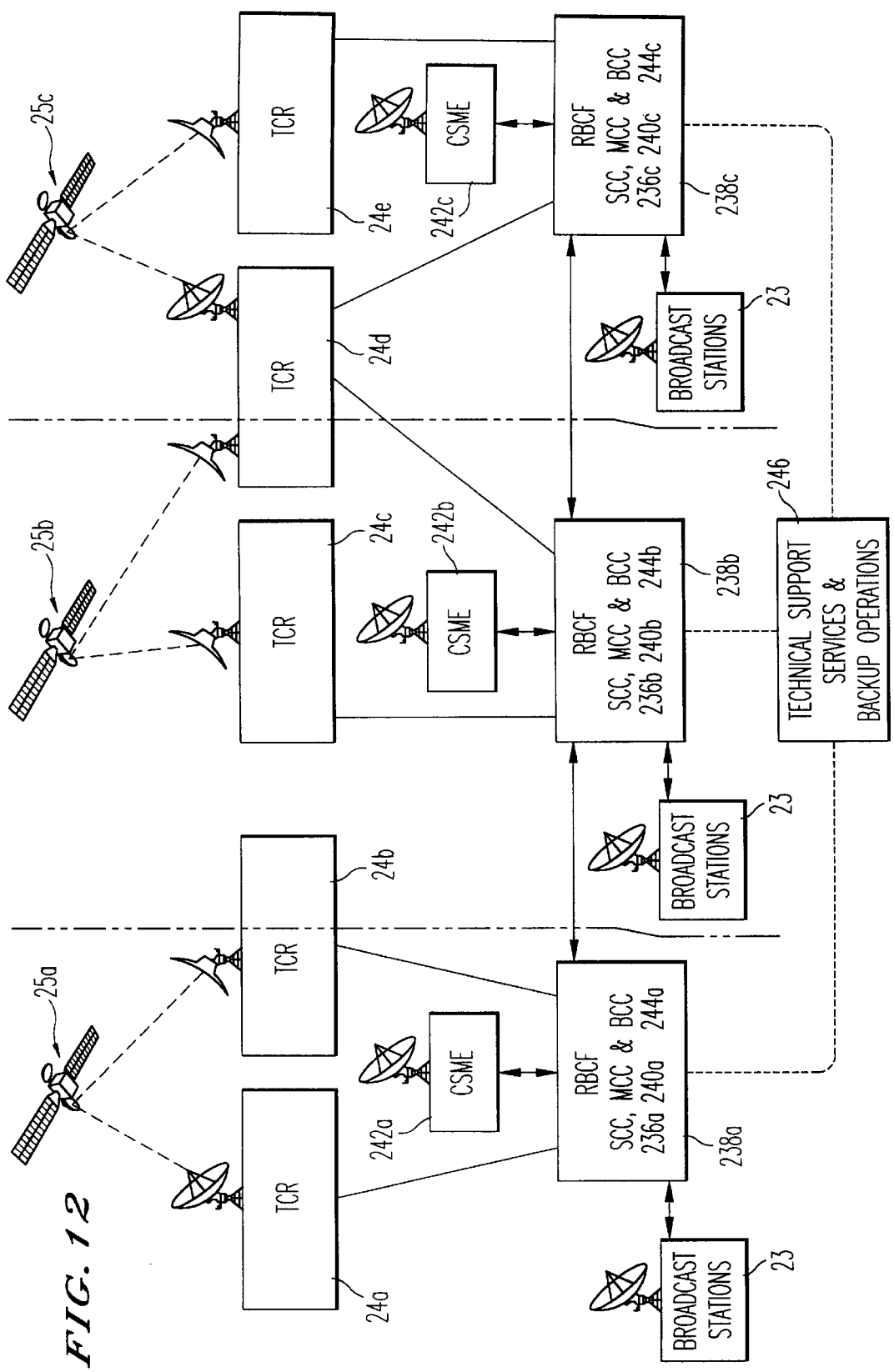
FIG. 12 is a schematic diagram of a system for managing satellite and broadcast stations in accordance with an embodiment of the present invention.

As stated previously, the system 10 can comprise one or a plurality of satellites 25. FIG. 12 depicts three satellites 25a, 25b and 25c for illustrative purposes. A system 10 having several satellites preferably comprises a plurality of TCR stations 24a, 24b, 24c, 24d and 24e located such that each satellite 25a, 25b and 25c is in line of sight of two TCR stations. The TCR stations referred to generally with reference numeral 24 are controlled by a regional broadcast control facility (RBCF) 238a, 238b or 238c. Each RBCF 238a, 238b and 238c comprises a satellite control center (SCC) 236a, 236b and 236c, a mission control center (MCC) 240a, 240b and 240c, and a broadcast control center (BCC) 244a, 244b and 244c, respectively. Each SCC controls the satellite bus and the communications payload and is where a space segment command and control computer and manpower resources are located. The facility is preferably manned 24 hours a day by a number of technicians trained in in-orbit satellite command and control. The SCCs 236a, 236b and 236c monitor the on-board components and essentially operate the corresponding satellite 25a, 25b and 25c. Each TCR station 24 is preferably connected directly to a corresponding SCC 236a, 236b or 236c by full-time, dual redundant PSTN circuits.

In each of the regions serviced by the satellites 25a, 25b and 25c, the corresponding RBCF 238a, 238b and 238c reserves broadcast channels for audio, data, video image services, assigns space segment channel routing via the mission control center (MCC) 240a, 240b, 240c, validates the delivery of the service, which is information required to bill a broadcast service provider, and bills the service provider.

Each MCC is configured to program the assignment of the space segment channels comprising uplink PRC frequency and downlink PRC TDM slot assignments. Each MCC performs both dynamic and static control. Dynamic control involves controlling time windows for assignments, that is, assigning space segment usage on a monthly, weekly and daily basis. Static control involves space segment assignments that do not vary on a monthly, weekly and daily basis. A sales office, which has personnel for selling space segment capacity at the corresponding RBCF, provides the MCC with data indicating available capacity and instructions to seize capacity that has been sold. The MCC generates an overall plan for occupying the time and frequency space of the system 10. The plan is then converted into instructions for the on-board routing switch 172 and is sent to the SCC for transmission to the satellite. The plan can be updated and transmitted to the satellite preferably once every 12 hours. The MCC 240a, 240b and 240c also monitors the satellite TDM signals received by corresponding channel system monitor equipment (CSME) 242a, 242b and 242c. CSME stations verify that broadcast stations 23 are delivering broadcast channels within specifications.

Each BCC 244a, 244b and 244c monitors the broadcast earth stations 23 in its region for proper operation within selected frequency, power and antenna pointing tolerances. The BCCs can also connect with corresponding broadcast stations to command malfunctioning stations off-the-air. The BCC is capable of sending a Do Not Transmit (DNTX) command via PSTN links that either shut the earth station down or inform an operator to shut the earth station down. The BCC monitors alarms of a broadcast station. The BCC also monitors and controls the broadcast stations to maintain their performance within predetermined tolerances regarding carrier frequency assignments. A central facility 246 is preferably provided for technical support services and backup operations for each of the SCCs.

While certain advantageous embodiments have been chosen to illustrate the invention, it will be understood by those skilled in the art that various changes and modifications can be made therein without departing from the scope of the invention as defined in the appended claims.

What is claimed is:

1. A system for managing a satellite and a number of broadcast stations for generating programs for transmission to remote radio receivers on broadcast channels via the satellite, the system comprising:

a satellite control system configured to generate control signals for controlling the attitude and orbit of said satellite, and data processing control signals for controlling on-board processing of said programs uplinked to said satellite via said broadcast stations and routing to downlink time division multiplexed carriers;

at least one telemetry, range and control system connected to said satellite control system and configured to communicate with said satellite to provide said control signals and said data processing signals from said satellite control system to said satellite; and a mission control system connected to said satellite control system and to said broadcast stations, said mission control system being operable to assign selected ones of said broadcast channels to service providers desiring to transmit at least one of said programs via said satellite, to store channel data relating to said assignments of said broadcast channels and provide said channel data to said satellite control system, and to bill said service providers according to the number of said broadcast channels assigned thereto, said mission control system providing said service providers with a plurality of options comprising number of said broadcast channels to be reserved for uplink transmission, dates and times of day for using said reserved broadcast channels, and which of a number of time division multiplexed signals in a number of beams associated with said satellite are to be used for downlink transmission, said mission control system being operable to indicate to said satellite control system which of time division multiplexed signals in said beams are to be used and said satellite control system generating corresponding said data processing signals for routing of said program to selected ones of said beams.

2. A system as claimed in claim 1, wherein said broadcast channels correspond to frequency locations in a predetermined radio frequency spectrum and said mission control system is programmable to assign noncontiguous ones of said broadcast channels to one of said service providers.

3. A system as claimed in claim 2, wherein said mission control system is operable to perform a defragmentation process to reassign said service providers to different broadcast channels to optimize the use of the satellite uplink spectrum.

4. A system as claimed in claim 1, further comprising a channel service monitor connected to said mission control system, said mission control system being operable to validate delivery of said programs with sufficient signal strength and sufficiently low bit error rate using said channel service monitor prior to billing said service providers.

5. A system as claimed in claim 1, further comprising a broadcast control center for monitoring and controlling said broadcast stations to maintain performance of said broadcast stations within predetermined tolerances regarding carrier frequency assignments, antenna power levels and antenna pointing.

6. A system as claimed in claim 1, further comprising a broadcast control center for monitoring and controlling said broadcast stations and being operable to instruct said broadcast stations to terminate use of said broadcast channels.

7. A system as claimed in claim 1, further comprising a broadcast control center for monitoring and controlling said broadcast stations and being operable to generate and transmit a command to at least one of said broadcast stations to power down said broadcast station.

8. A system for managing a satellite and a number of broadcast stations for generating programs for transmission to remote radio receivers via the satellite, the system comprising:

a satellite control system configured to generate control signals for controlling the operation of said satellite, said satellite being configured to receive an uplink comprising frequency division multiple access channels and to generate at least two time division multiplexed downlink signals, each of said signals comprising a plurality of time slots, said broadcast stations being operable to modulate said programs into prime rate increments for transmission on selected ones of said frequency division multiple access channels, said satellite being further configured to route said prime rate increments to selected ones of said time slots in accordance with said control signals;

a mission control system connected to said satellite control system and to said broadcast stations, said mission control system being operable to assign selected ones of said frequency division multiple access channels to service providers desiring to transmit said prime rate increments via said satellite, to assign at least one of said time division multiplexed signals for downlink transmission of said prime rate increments, to store channel data relating to said assignments of said frequency division multiple access channels and said time division multiplexed signals and to provide said channel data to said satellite control system for generating said control signals; and at least one telemetry, range and control system connected to said satellite control system and configured to communicate with said satellite to provide said control signals from said satellite control system to said satellite.

9. A system as claimed in claim 8, wherein said mission control system is programmable to assign noncontiguous ones of said frequency division multiple access channels to one of said service providers.

10. A system as claimed in claim 8, wherein said system is operable to validate successful transmission of said prime rate increments via at least one of time division multiplexed signals prior to generating respective bills for corresponding said service providers.

11. A system as claimed in claim 8, wherein said master control system is operable to perform dynamic control by assigning selected ones of said frequency division multiple access channels for periodic and temporary usage by at least a selected one of said service providers on one of a monthly, weekly and daily basis.

12. A system as claimed in claim 8, wherein said master control system is operable to perform static control by assigning selected ones of said frequency division multiple access channels to selected ones of said service providers for substantially constant and exclusive use.

13. A system as claimed in claim 8, further comprising a broadcast control system connected to said broadcast stations and operable to monitor said broadcast stations to determine if said broadcast stations are performing within predetermined tolerances relating to at least one of frequency, power and the direction of an antennae connected to respective said broadcast stations.

14. A system as claimed in claim 8, further comprising a broadcast control system connected to said broadcast stations and operable to monitor said broadcast stations to determine if said broadcast stations are performing within predetermined tolerances, and to generate and transmit a command to at least one of said broadcast stations to power down said broadcast station.

* * * * *